US009911428B2

(12) United States Patent
Matsumoto

(10) Patent No.: US 9,911,428 B2
(45) Date of Patent: Mar. 6, 2018

(54) NOISE SUPPRESSING APPARATUS, SPEECH RECOGNITION APPARATUS, AND NOISE SUPPRESSING METHOD

(71) Applicant: FUJITSU LIMITED, Kawasaki-shi, Kanagawa (JP)

(72) Inventor: Chikako Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/468,373

(22) Filed: Mar. 24, 2017

(65) Prior Publication Data

US 2017/0287501 A1 Oct. 5, 2017

(30) Foreign Application Priority Data

Mar. 31, 2016 (JP) .................................. 2016-071021

(51) Int. Cl.
*G10L 15/20* (2006.01)
*G10L 21/0232* (2013.01)
(Continued)

(52) U.S. Cl.
CPC ........ *G10L 21/0232* (2013.01); *G10L 21/028* (2013.01); *G10L 25/87* (2013.01); *G10L 2021/02165* (2013.01)

(58) Field of Classification Search
CPC ....... G10L 2021/02166; G10L 21/0208; G10L 21/0216; G10L 21/028; G10L 2021/02165;
(Continued)

(56) References Cited

U.S. PATENT DOCUMENTS

2011/0038489 A1* 2/2011 Visser .................. G01S 3/8006
381/92
2012/0239394 A1 9/2012 Matsumoto
(Continued)

FOREIGN PATENT DOCUMENTS

EP 1953734 A2 8/2008
JP 2008-294690 12/2008
(Continued)

OTHER PUBLICATIONS

European Search Report dated Aug. 25, 2017 for corresponding European Patent Application No. 7163024.7, 7 pages. Please note US-2012/0239394-A1 cited herewith, was previously filed in an IDS on Mar. 24, 2017.*

*Primary Examiner* — Huyen Vo
(74) *Attorney, Agent, or Firm* — Fujitsu Patent Center

(57) ABSTRACT

A noise suppressing apparatus calculates a phase difference on the basis of a first and second sound signal obtained by a microphone array; calculates a first sound arrival rate on the basis of a first phase difference area and the phase difference and a second sound arrival rate on the basis of a second phase difference area and the phase difference; calculates a dissimilarity that represents a level of difference between the first sound arrival rate and the second sound arrival rate; determines whether the pickup target sound is included in the first sound signal on the basis of the dissimilarity; and determines a suppression coefficient to be applied to the frequency spectrum of the first sound signal, on the basis of a result of the determination of whether the pickup target sound is included and on the basis of the phase difference.

12 Claims, 23 Drawing Sheets

(51) Int. Cl.
*G10L 25/87* (2013.01)
*G10L 21/028* (2013.01)
*G10L 21/0216* (2013.01)

(58) Field of Classification Search
CPC . G10L 21/02; G10L 21/0205; G10L 21/0232; G10L 21/0272; G01S 3/808; G01S 3/8006
USPC ........... 704/200–233, 500–504; 381/92, 71.1
See application file for complete search history.

(56) References Cited

U.S. PATENT DOCUMENTS

2014/0023199 A1* 1/2014 Giesbrecht .......... G10L 21/0216
381/71.1
2017/0307721 A1* 10/2017 Sugiyama ............... G01S 3/808

FOREIGN PATENT DOCUMENTS

| | | |
|---|---|---|
| JP | 2012-198289 | 10/2012 |
| JP | 2014-072708 | 4/2014 |

\* cited by examiner

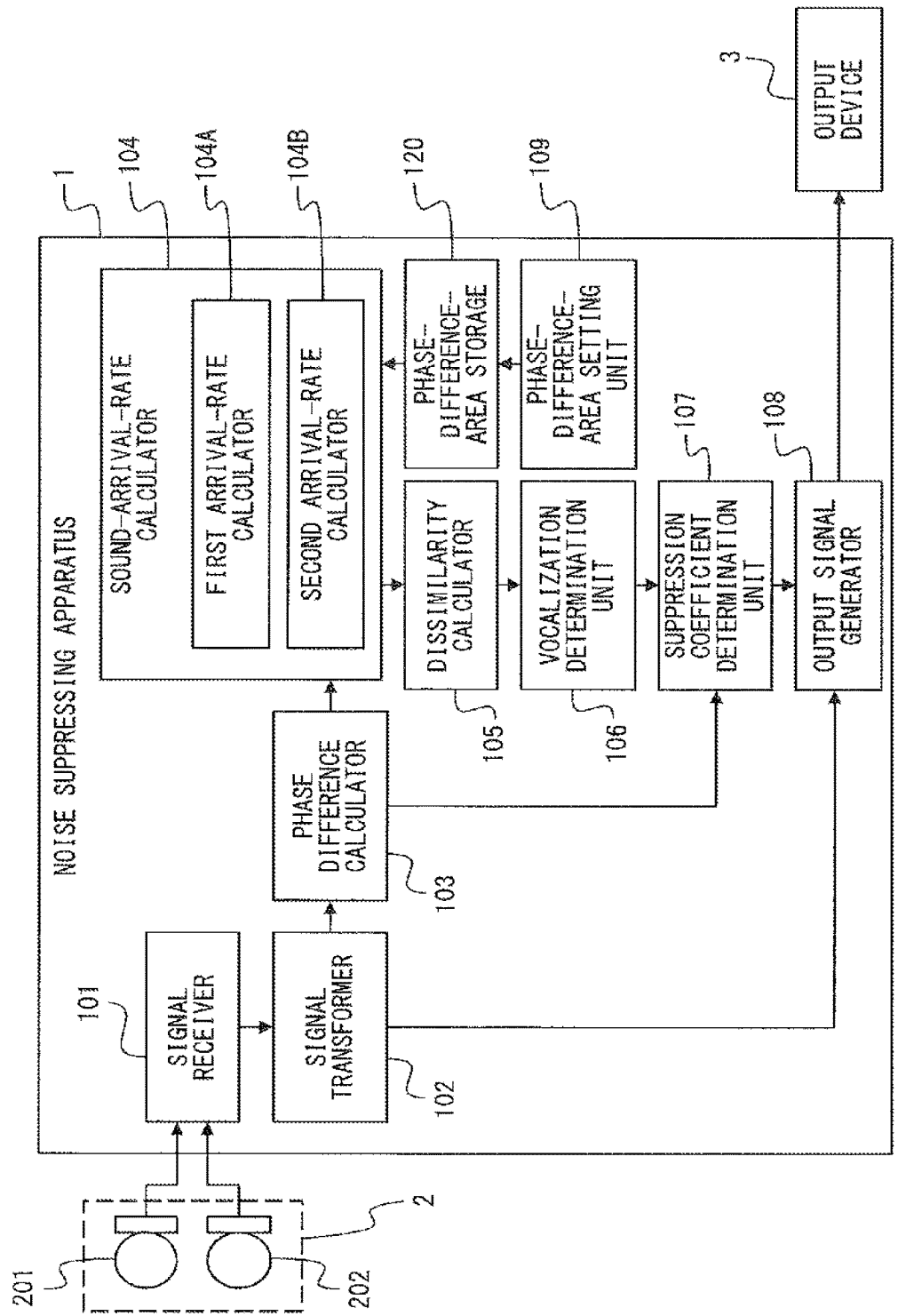
F I G. 1

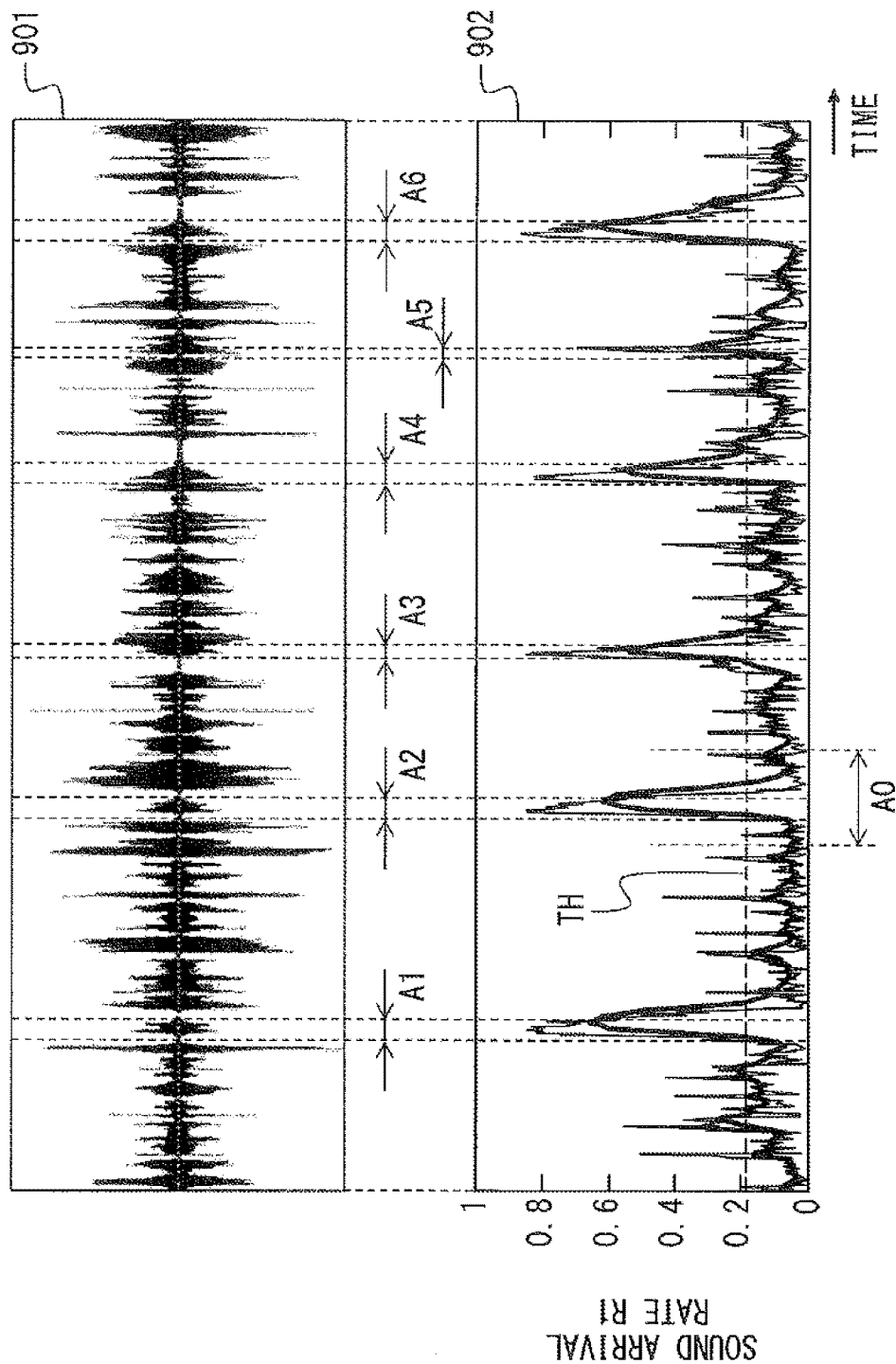
F I G. 4 A

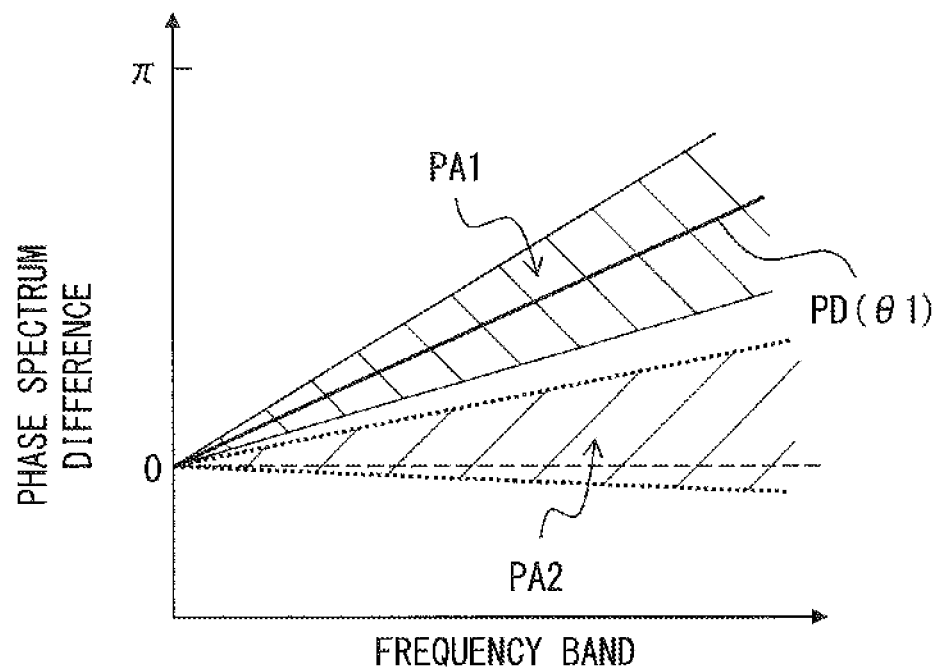
F I G. 5

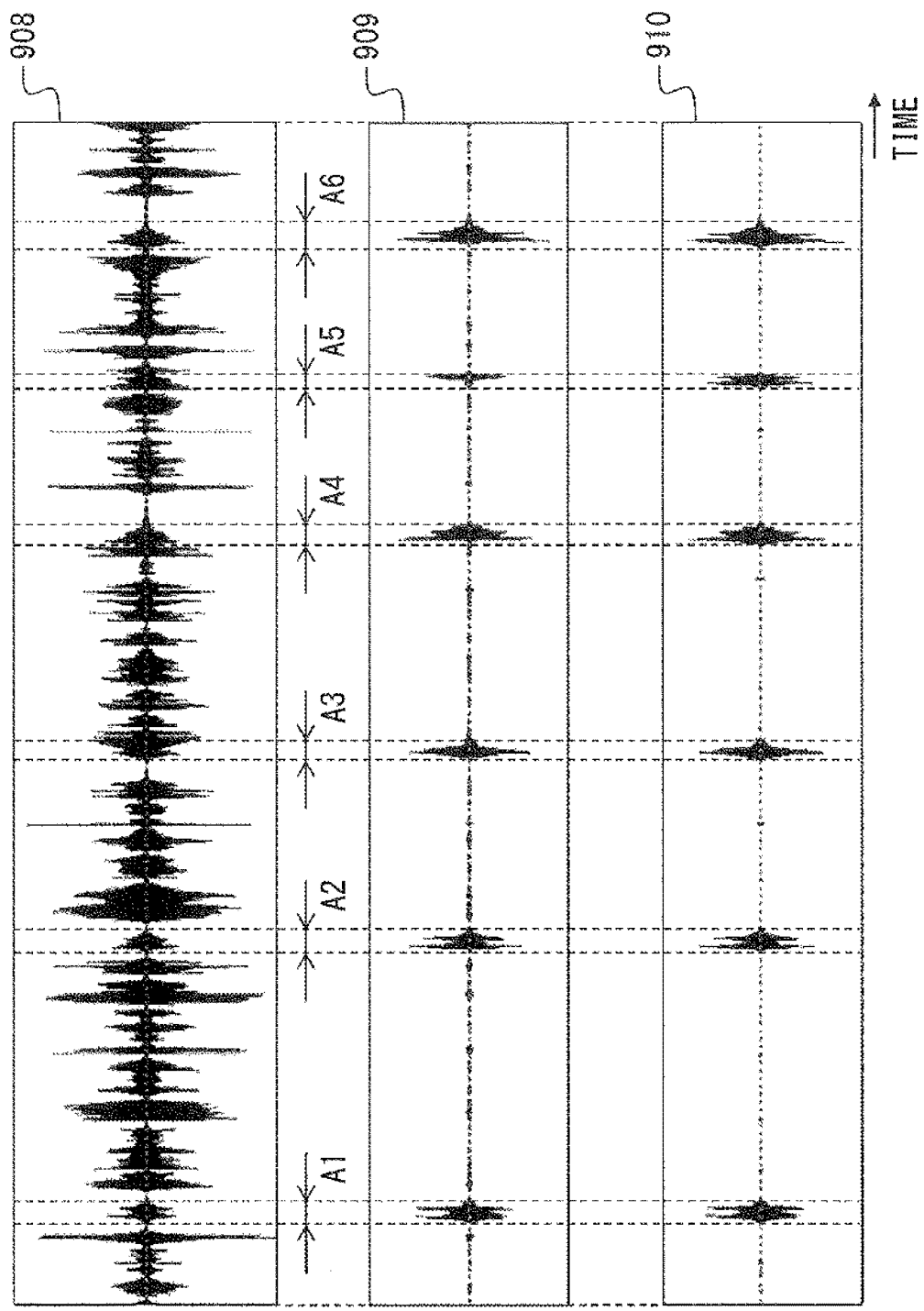
F I G. 8

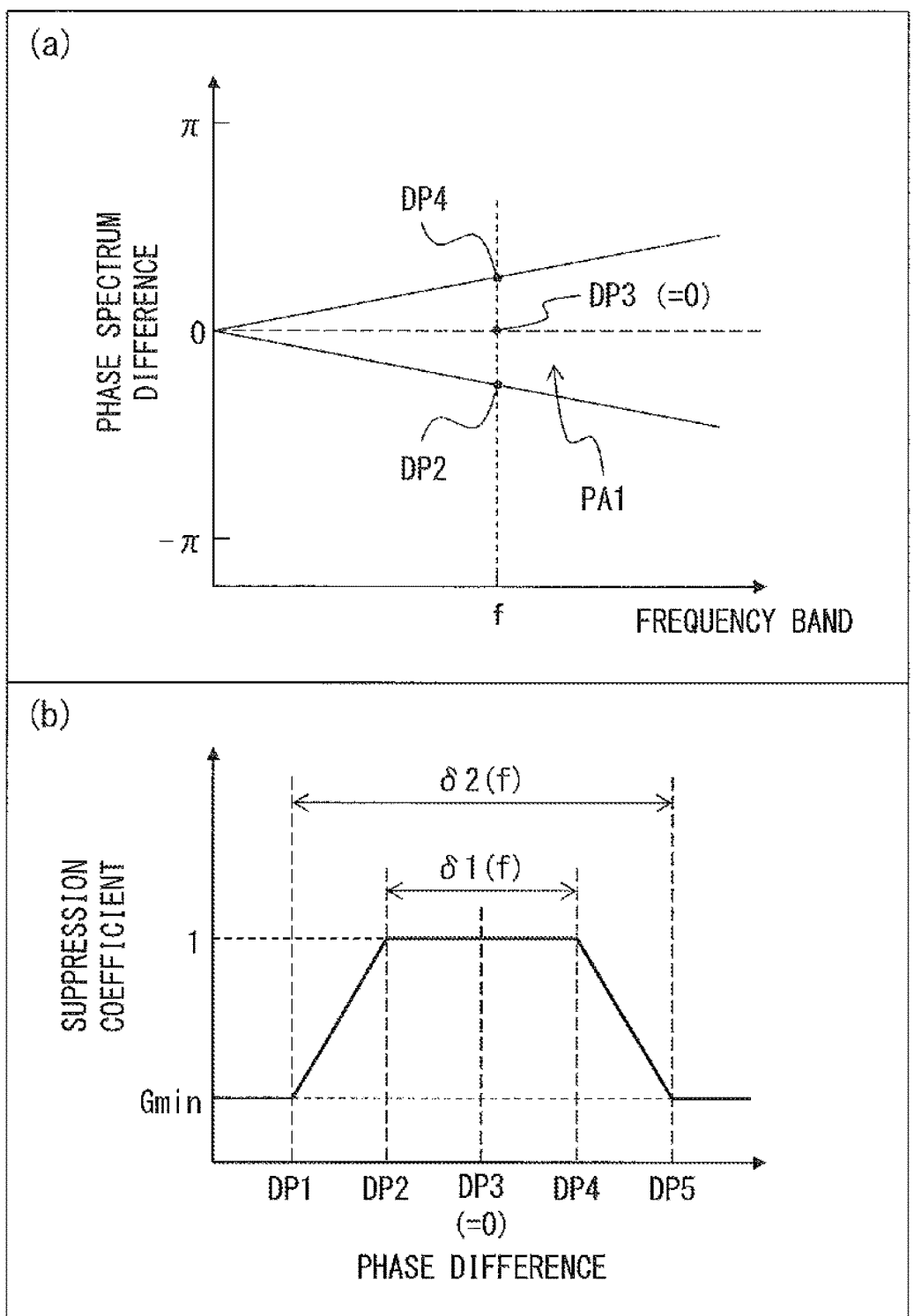
F I G. 1 1

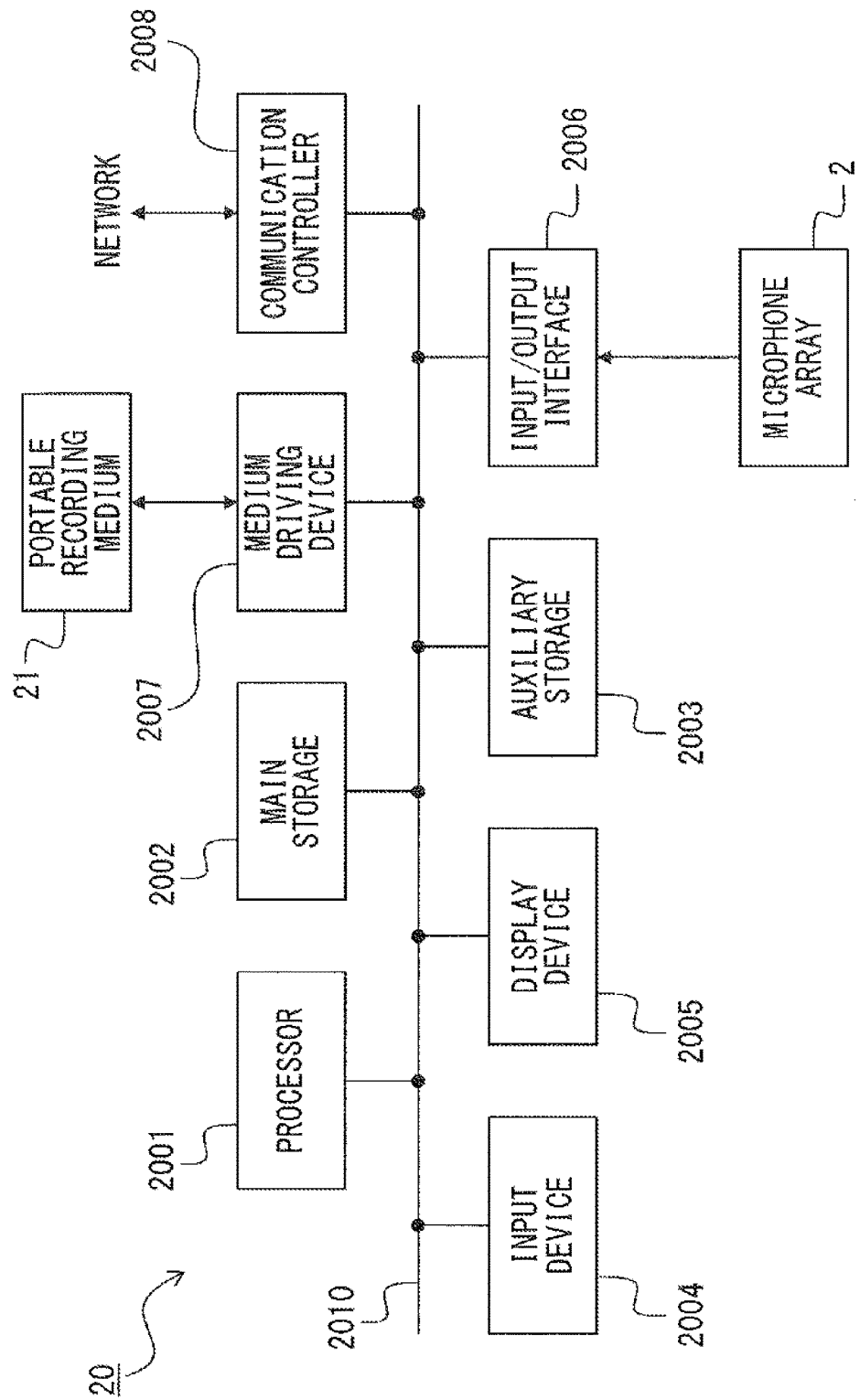
F I G. 17

NOISE SUPPRESSING APPARATUS, SPEECH RECOGNITION APPARATUS, AND NOISE SUPPRESSING METHOD

CROSS-REFERENCE TO RELATED APPLICATION

This application is based upon and claims the benefit of priority of the prior Japanese Patent Application No. 2016-071021, filed on Mar. 31, 2016, the entire contents of which are incorporated herein by reference.

FIELD

The embodiments discussed herein are related to a noise suppressing apparatus.

BACKGROUND

A method for determining a suppression coefficient for suppressing noise on the basis of a phase difference in a plurality of sound signals input from a microphone array is known as a method for suppressing a noise component included in a sound signal picked up by a microphone. Further, with respect to this type of noise suppressing method, it is known that a vocalization interval is detected from a sound signal on the basis of a phase difference in a plurality of sound signals and that a method for determining a suppression coefficient is changed between a vocalization interval and a non-vocalization interval.

When a vocalization interval is detected from a sound signal, a phase difference area is set that includes a direction of a sound source as viewed from a microphone array, and it is determined whether the interval is a vocalization interval on the basis of an arrival rate of a sound that arrives from a direction of the phase difference area. The sound arrival rate is calculated on the basis of the phase difference area and a phase difference in each frequency band with respect to a plurality of sound signals. Whether the interval is a vocalization interval is determined according to whether the sound arrival rate is not less than a threshold. When it is determined whether the interval is a vocalization interval on the basis of the sound arrival rate, a time at which the sound arrival rate is changed from a value less than the threshold to a value not less than the threshold is a start time of a vocalization interval, and a time at which the sound arrival rate is changed from the value not less than the threshold to the value less than the threshold is a finish time of the vocalization interval.

Further, a method for reducing a false detection of a vocalization interval due to residual noise (a source error) by time-smoothing a sound arrival rate in a plurality of consecutive frames when it is determined whether the interval is a vocalization interval on the basis of the arrival rate is known (see, for example, Patent Document 1).

Document 1: Japanese Laid-open Patent Publication No. 2012-198289

SUMMARY

According to an aspect of the embodiment, a noise suppressing apparatus that suppresses noise included in a sound signal, the noise suppressing apparatus includes: a memory; and a processor configured to be connected to the memory and to perform processing of suppressing the noise included in the sound signal, wherein the processing of suppressing the noise includes: calculating a phase difference on the basis of frequency spectra of a first sound signal and a second sound signal obtained by picking up a pickup target sound using a microphone array; calculating a first sound arrival rate on the basis of a first phase difference area and the phase difference and calculating a second sound arrival rate on the basis of a second phase difference area and the phase difference, wherein the first phase difference area is set on the basis of a direction of arrival of the pickup target sound which arrives at the microphone array, and the second phase difference area is different from the first phase difference area; calculating a dissimilarity that represents a level of difference between the first sound arrival rate and the second sound arrival rate; determining whether the pickup target sound is included in the first sound signal on the basis of the dissimilarity; and determining a suppression coefficient to be applied to the frequency spectrum with respect to the first sound signal, on the basis of a result of the determination of whether the pickup target sound is included and on the basis of the phase difference.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 1 illustrates a functional configuration of a noise suppressing apparatus according to a first embodiment;

FIG. 4A is a set of graphs that explain a relationship between a sound input signal and a sound arrival rate;

FIG. 5 illustrates an example of setting a first phase difference area and a second phase difference area in the noise suppressing processing according the first embodiment;

FIG. 8 is a set of graphs that compare waveforms of a sound signal before and after the noise suppressing processing;

FIG. 11 is a set of graphs that explain an example of a method for calculating a suppression coefficient;

FIG. 17 illustrates a hardware configuration of a computer.

DESCRIPTION OF EMBODIMENTS

Figure 2A:
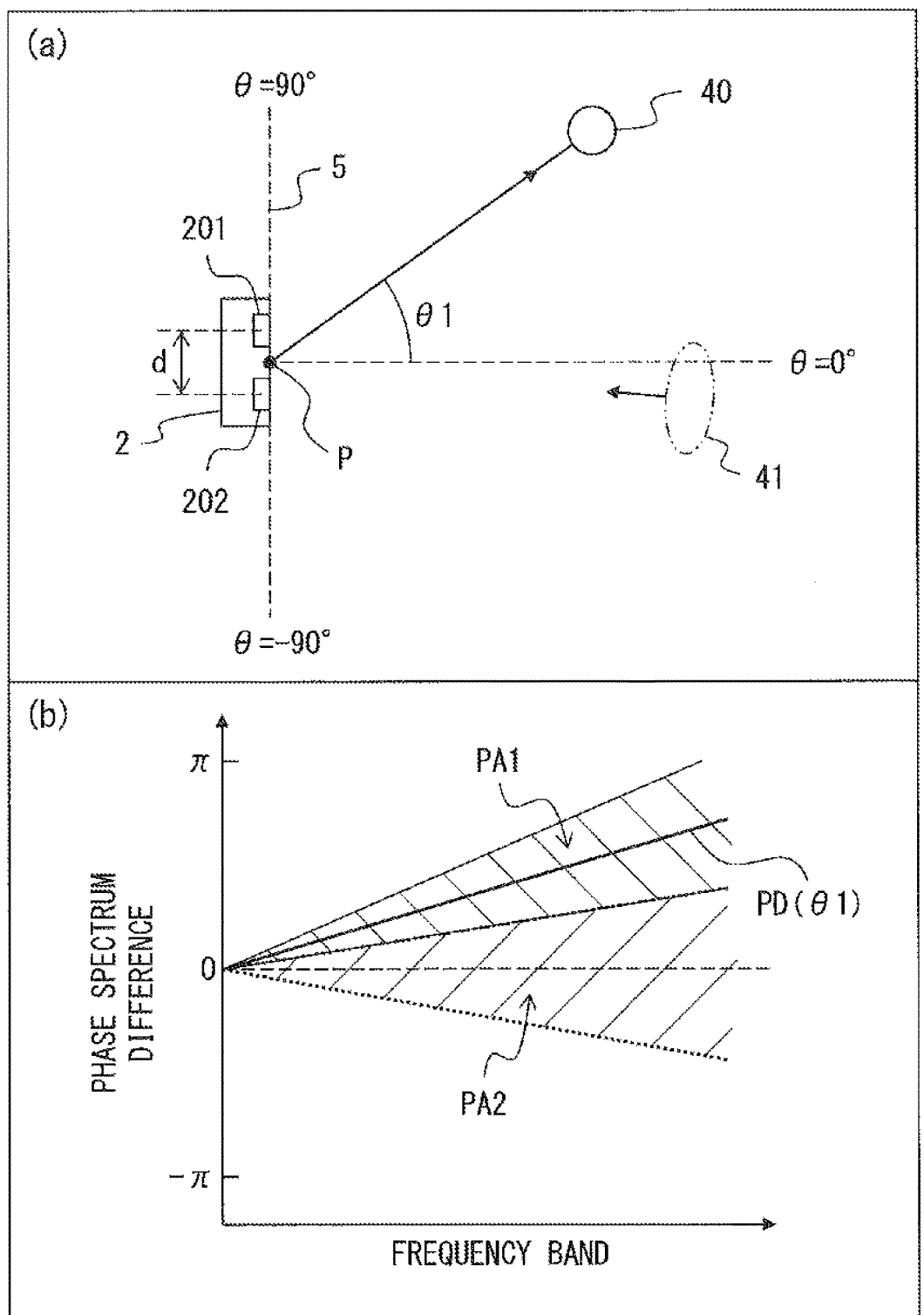
FIG. 2A is a diagram that explains a first example of a combination of a phase difference area.

When a false detection of a vocalization interval is reduced by time-smoothing, it is determined whether a target sound is included in a sound signal on the basis of a change in a sound arrival rate for several frames after the arrival rate is changed from a value less than a threshold to a value not less than the threshold. Thus, a start time of a vocalization interval determined on the basis of a time-smoothed arrival rate is delayed from a start time of an actual vocalization interval in the sound signal. Thus, when a time-smoothing is performed, a false detection of a vocalization interval due to residual noise is reduced, but a vocalization just after a start of an actual vocalization interval is excluded from a vocalization interval determined on the basis of a time-smoothed arrival rate and an interruption of a beginning of a word occurs, which may result in deteriorating a sound quality or in reducing a speech recognition rate.

Preferred embodiments of the present invention will be explained with reference to accompanying drawings.

First Embodiment

FIG. 1 illustrates a functional configuration of a noise suppressing apparatus according to a first embodiment.

As illustrated in FIG. 1, a noise suppressing apparatus 1 according to the present embodiment includes a signal receiver 101, a signal transformer 102, a phase difference calculator 103, a sound-arrival-rate calculator 104, a dissimilarity calculator 105, a vocalization determination unit 106, a suppression coefficient determination unit 107, and an output signal generator 108. The noise suppressing apparatus 1 further includes a phase-difference-area setting unit 109 and a phase-difference-area storage 120.

The signal receiver 101 receives an input of a sound signal picked up by a microphone array 2 that includes a first microphone 201 and a second microphone 202, and divides each sound signal into units (into frames) for processing noise suppression. The microphone will hereinafter be referred to as a "mike". Further, a sound signal from the first mike 201 or the second mike 202 that is received by the signal receiver 101 will hereinafter be referred to as a "sound input signal". The signal receiver 101 transmits the received sound input signal to the signal transformer 102.

The signal transformer 102 transforms a sound input signal from a time domain into a frequency domain for each frame, using, for example, a Fast Fourier Transform. The sound input signal that has been transformed by the signal transformer 102 into a frequency-domain one (that is, a frequency spectrum) includes a phase spectrum that represents a phase of each frequency band in a frame. The signal transformer 102 transmits the frequency spectrum including a phase spectrum to the phase difference calculator 103. The signal transformer 102 also transmits the frequency spectrum to, for example, the output signal generator 108.

The phase difference calculator 103 calculates a phase difference of a frame in a sound input signal on the basis of a phase spectrum of the frame in a sound input signal from the first mike 201 and a phase spectrum of the frame in a sound input signal from the second mike 202. The phase difference calculator 103 transmits the calculated phase difference to the sound-arrival-rate calculator 104. The phase difference calculator 103 also transmits the calculated phase difference to, for example, the suppression coefficient determination unit 107.

On the basis of the phase difference calculated by the phase difference calculator 103, the sound-arrival-rate calculator 104 calculates an arrival rate of a sound that arrives from a predetermined direction. The sound-arrival-rate calculator 104 of the noise suppressing apparatus 1 according to the present embodiment includes a first arrival-rate calculator 104A and a second arrival-rate calculator 104B. The first arrival-rate calculator 104A and the second arrival-rate calculator 104B are different from each other in a combination of an arrival direction of and an angle range of a sound for which an arrival rate is calculated (that is, in a phase difference area of the sound for which an arrival rate is calculated). The first arrival-rate calculator 104A calculates an arrival rate of a sound (a first sound arrival rate R1) from a first phase difference area that includes a direction in which there exists a sound source of a pickup target sound (hereinafter also referred to as a "target sound"). The second arrival-rate calculator 104B calculates an arrival rate of a sound (a second sound arrival rate R2) from a second phase difference area that is different from the first phase difference area. The first sound arrival rate R1 and the second sound arrival rate R2 are stored in the phase-difference-area storage 120. The sound-arrival-rate calculator 104 transmits the calculated first sound arrival rate R1 and the calculated second sound arrival rate R2 to the dissimilarity calculator 105.

The dissimilarity calculator 105 calculates a dissimilarity between the first sound arrival rate R1 and the second sound arrival rate R2. The dissimilarity calculator 105 calculates, for example, a ratio of a sound arrival rate (R1/R2) as a dissimilarity between the first sound arrival rate R1 and the second sound arrival rate R2. The dissimilarity calculator 105 transmits the calculated dissimilarity to the vocalization determination unit 106.

The vocalization determination unit 106 determines, on the basis of the dissimilarity between the first sound arrival rate R1 and the second sound arrival rate R2, whether there exists a vocalization of a target sound in a frame that is a current processing target, and detects a vocalization interval of the target sound in a sound input signal. For example, the vocalization determination unit 106 determines, to be a frame within a vocalization interval, a frame whose ratio (R1/R2) of a sound arrival rate is not less than a predetermined threshold TH1 in time-series data about a ratio (R1/R2) of a sound arrival rate in each frame that is calculated by the dissimilarity calculator 105. The vocalization determination unit 106 outputs, to the suppression coefficient determination unit 107, a result of the determination of whether there exists a vocalization in the frame that is the current processing target.

For example, the suppression coefficient determination unit 107 determines a suppression coefficient applied to a power value of each frequency band in a frequency spectrum with respect to a sound input signal from the first mike 201, on the basis of the result of the determination of whether there exists a vocalization and on the basis of a phase difference for each frequency band. The suppression coefficient determination unit 107 transmits the calculated suppression coefficient to the output signal generator 108.

The output signal generator 108 applies a suppression coefficient to a frequency spectrum of the sound input signal from the first mike 201 for each frequency band, and generates a sound signal from the frequency spectrum in which a noise component has been suppressed. The output signal generator 108 transforms a frequency spectrum in which noise has been suppressed into a frame of a time-domain sound signal using, for example, an Inverse Fast Fourier Transform. The output signal generator 108 transmits the generated sound signal to an output device 3. The output device 3 is, for example, a device that transforms a sound signal from, for example, a speaker into a sound wave and emits the sound wave, or a device that modulates a sound signal generated by the output signal generator 108 into a radio signal. The output device 3 may be a device that recognizes a sound on the basis of a sound signal generated by the output signal generator 108.

The phase-difference-area setting unit 109 receives an input of a user's manipulation of a setting of a phase difference area. The phase-difference-area setting unit 109 may only receive a manipulation of a setting of a second phase difference area or may receive manipulations of settings of a first phase difference area and the second phase difference area.

As described above, the noise suppressing apparatus 1 according to the present embodiment determines whether there exists a vocalization on the basis of a dissimilarity between a first sound arrival rate and a second sound arrival rate. The first sound arrival rate and the second sound arrival rate are different from each other in a phase difference area for which an arrival rate is calculated. Any combination of the first phase difference area for which the first sound arrival rate is calculated and the second phase difference area for which the second sound arrival rate is calculated is acceptable, and it is possible to set the combination as appropriate, for example on the basis of a positional relationship between the microphone array 2 and a source of a target sound or on the basis of a positional relationship between the source of the target sound and a sound source of noise. The combination of the first phase difference area and the second phase difference area is roughly classified into four combinations illustrated in FIGS. 2A to 2D.

Figure 2B:
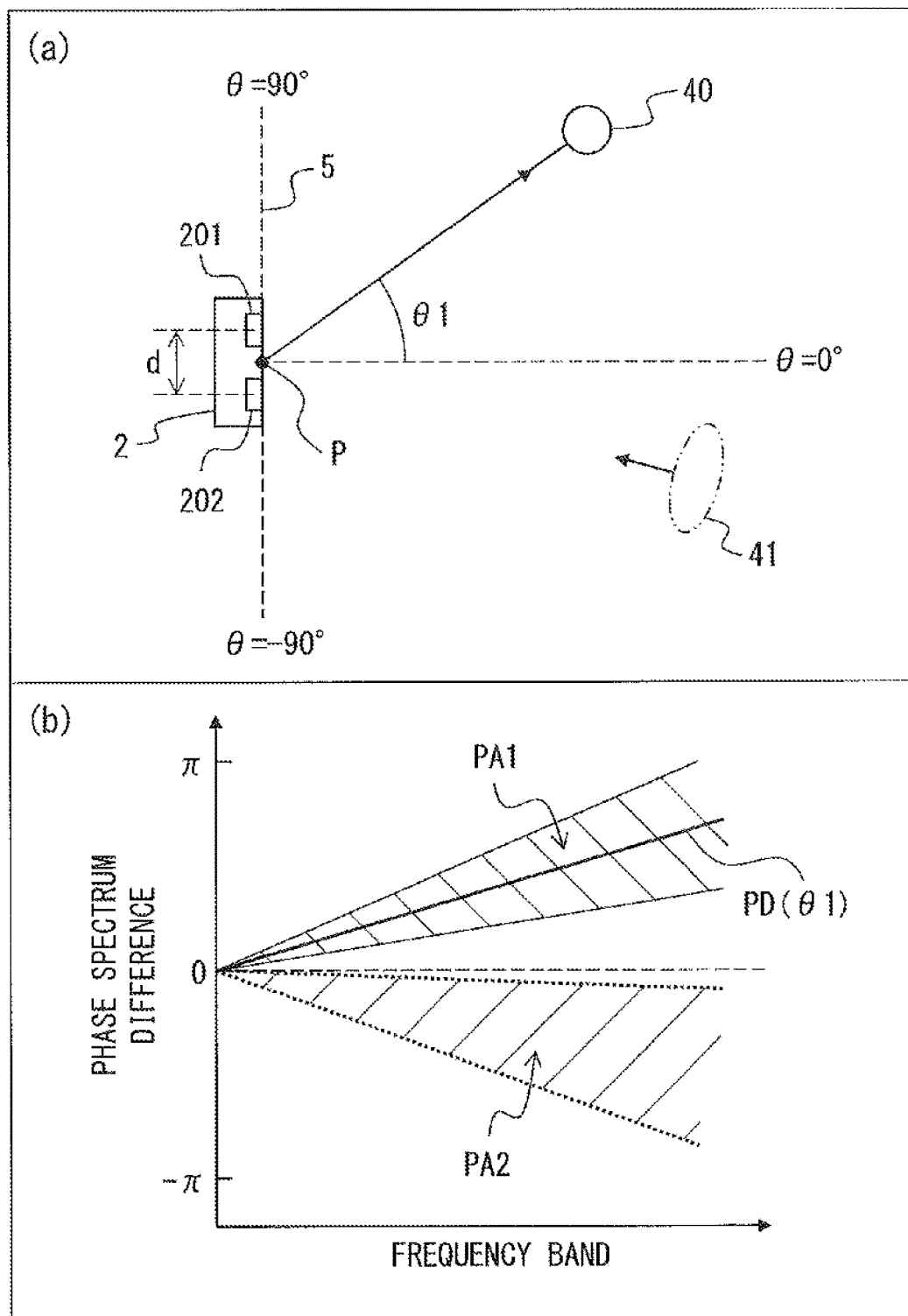
FIG. 2B is a diagram that explains a second example of the combination of a phase difference area.
Figure 2C:
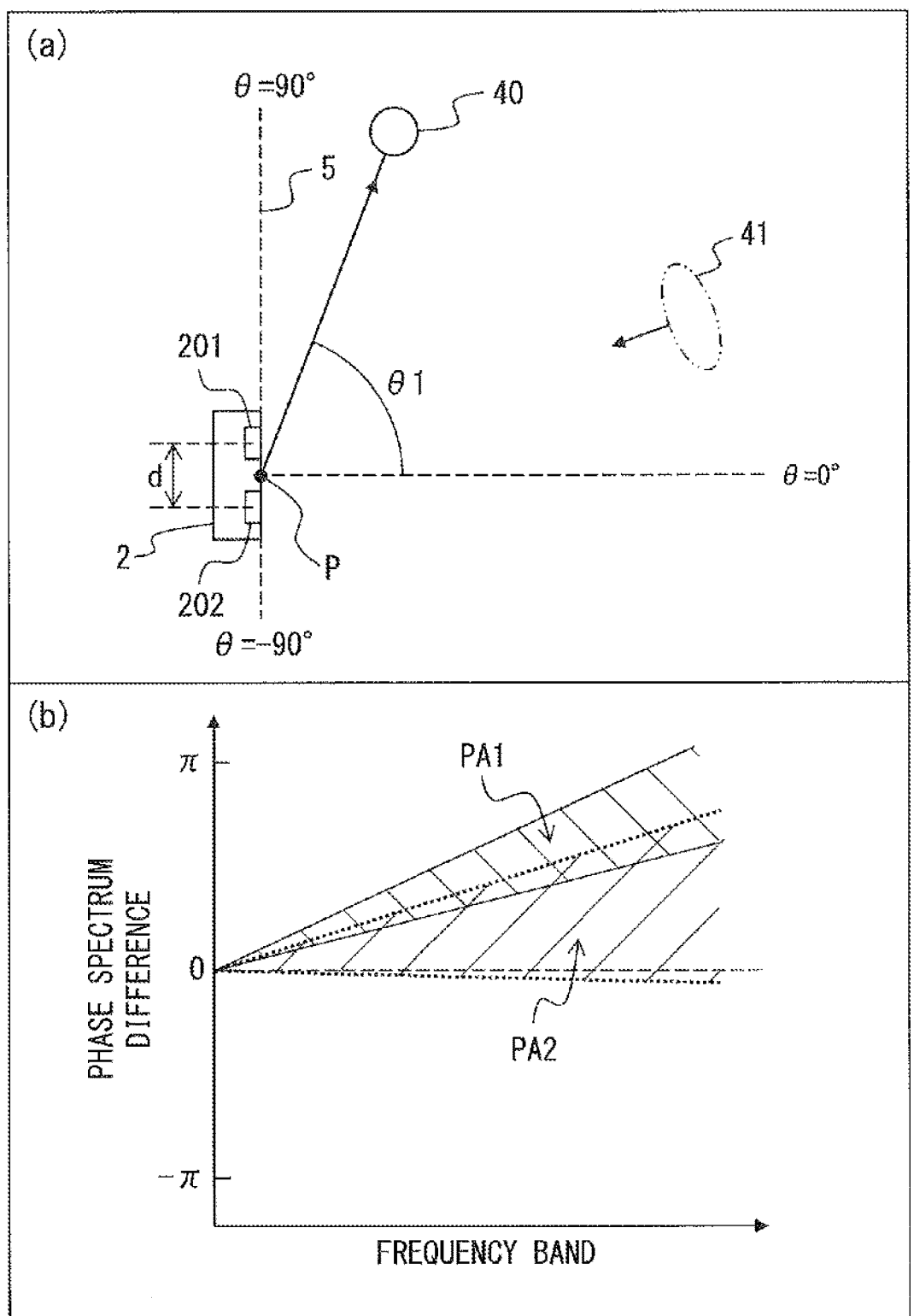
FIG. 2C is a diagram that explains a third example of the combination of a phase difference area.
Figure 2D:
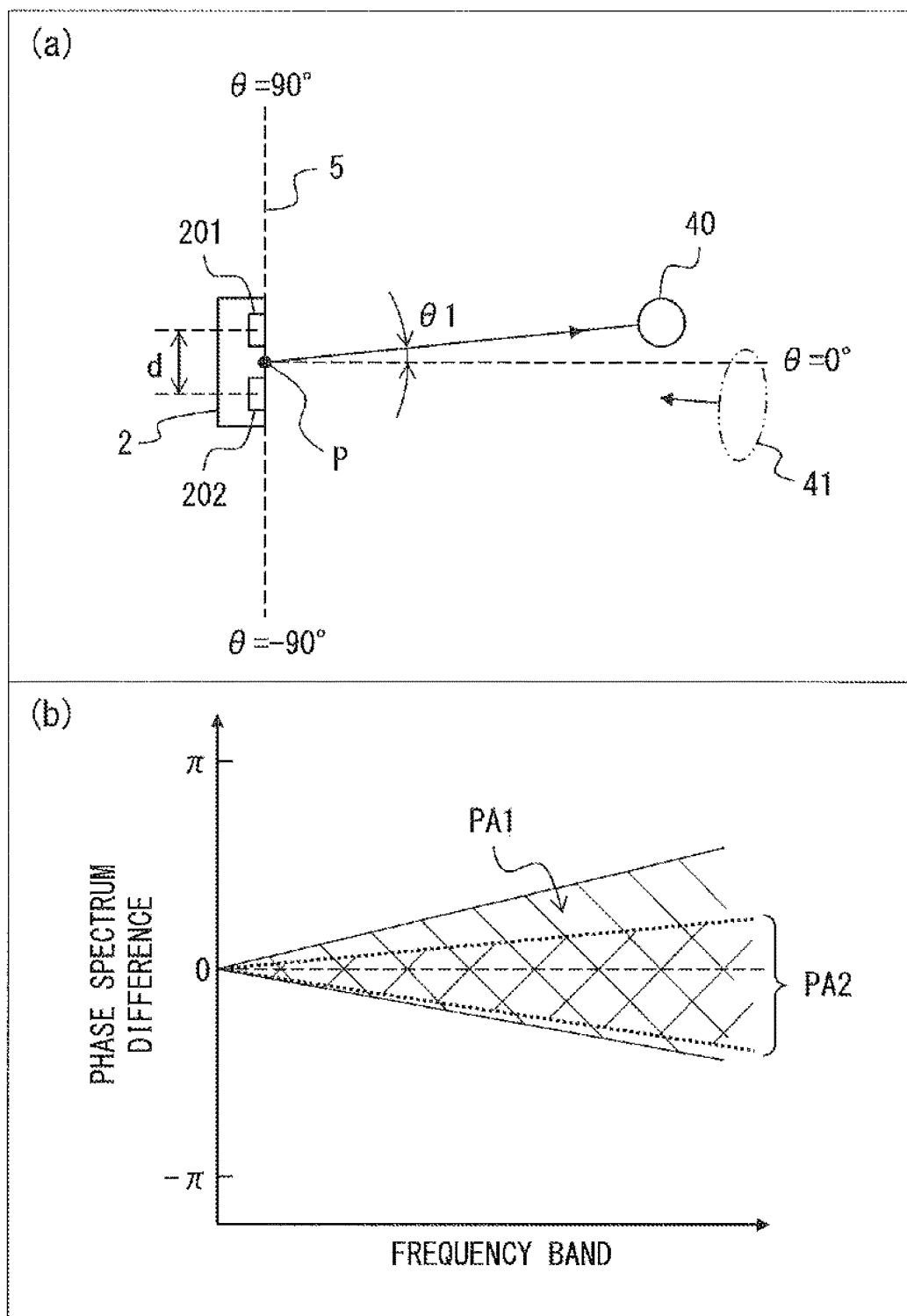
FIG. 2D is a diagram that explains a fourth example of the combination of a phase difference area.

FIG. 2A is a diagram that explains a first example of a combination of a phase difference area. FIG. 2B is a diagram that explains a second example of the combination of a phase difference area. FIG. 2C is a diagram that explains a third example of the combination of a phase difference area. FIG. 2D is a diagram that explains a fourth example of the combination of a phase difference area.

(a) of FIG. 2A illustrates a first example of a positional relationship between the microphone array 2, a sound source 40 of a target sound, and a sound source 41 of possible noise in a real space. (b) of FIG. 2A illustrates an example of a relationship between a first phase difference area PA1 and a second phase difference area PA2 when the microphone array 2 and the sound sources 40 and 41 have the positional relationship illustrated in (a) of FIG. 2A. The sound source 41 of noise may be any device that produces the noise, or may be a virtual sound source that indicates a direction from which the noise reflected off various objects in the real space arrives.

The phase difference area PA1 for which a first sound arrival rate is calculated is set on the basis of a positional relationship between the microphone array 2 and the sound source 40 of a target sound. The positional relationship between the microphone array 2 and the sound source 40 of a target sound is represented by a direction $\theta1$ of the sound source 40 of a target sound as viewed from the microphone array 2. As illustrated in (a) of FIG. 2A, the direction $\theta1$ of the sound source 40 of a target sound has its origin at a point P situated midway between the first mike 201 and the second mike 202 on a reference surface 5 that includes sound-pickup surfaces of the first mike 201 and the second mike 202, and is represented by an angle from a normal of the reference surface 5 that passes through the origin. In the example of (a) of FIG. 2A, a normal direction of the reference surface 5 is $\theta1=0$ degrees, and an anticlockwise direction is positive.

When the direction of the sound source 40 of a target sound is $\theta1 \neq 0$ degrees, a phase difference according to the magnitude of an angle $\theta1$ occurs between a first sound input signal picked up by the first mike 201 and a second sound input signal picked up by the second mike 202. When the direction of the sound source 40 of a target sound is $\theta1$ (≠0), the phase difference between a phase spectrum of the first sound input signal and a phase spectrum of the second sound input signal is theoretically indicated by a thick line PD ($\theta1$) illustrated in (b) of FIG. 2A. In other words, when the direction of the sound source 40 of a target sound is $\theta1$ (≠0), the phase difference for each frequency band is proportional to the magnitude of a frequency.

Further, if an absolute value of the angle $\theta1$ representing the direction of the sound source 40 of a target sound becomes larger, an absolute value of a constant of proportionality that represents a phase difference for each frequency band becomes larger.

However, in the real space in which the microphone array 2 is arranged, there occurs a fluctuation in a phase difference between a sound that arrives at the first mike 201 and a sound that arrives at the second mike 202 from the sound source 40 of the target sound due to, for example, the environment in the space. Thus, when a phase difference area is set, a phase difference between a sound that arrives at the first mike 201 and a sound that arrives at the second mike 202 is calculated on the basis of the direction of the sound source 40 of a target sound as viewed from the first mike 201 and on the basis of a distance d between the mikes. Then, the first phase difference area PA1 from which a target sound from the sound source 40 of a target sound comes is set on the basis of the calculated phase difference and a level of the fluctuation which occurs in a phase difference.

On the other hand, for example, the second phase difference area PA2 is set on the basis of the direction of the sound source 40 of a target sound as viewed from the microphone array 2 and on the basis of a direction of arrival of noise that is assumed to be picked up by the microphone array 2 (a direction of the sound source 41).

In (a) of FIG. 2A, the direction $\theta1$ of the sound source 40 of a target sound is a positive direction. Thus, it is assumed that the direction of arrival of noise picked up by the microphone array 2 (the direction of the sound source 41) is, for example, around zero degrees. In this case, for example, the second phase difference area PA2 is adjacent to the first phase difference area PA1 in a direction in which a phase difference is smaller as viewed from the first phase difference area PA1, as illustrated in (b) of FIG. 2A.

When the direction $\theta1$ of the sound source 40 of a target sound is a positive direction, it may be assumed that the direction of arrival of noise picked up by the microphone array 2 (the direction of the sound source 41) is, for example, a direction that is more negative than the direction illustrated in (a) of FIG. 2A, as illustrated in (a) of FIG. 2B. In this case, for example, the second phase difference area PA2 is set away from the first phase difference area PA1 in a direction in which a phase difference is smaller as viewed from the first phase difference area PA1, as illustrated in (b) of FIG. 2B.

When the direction θ1 of the sound source 40 of a target sound is a positive direction and when θ1=90 degrees as illustrated in (a) of FIG. 2C, it may be assumed that the direction of arrival of noise picked up by the microphone array 2 (the direction of the sound source 41) is, for example, between 0 to θ1 degrees. In this case, the second phase difference area PA2 may be set in a direction in which a phase difference is smaller as viewed from the first phase difference area PA1, such that a portion of the second phase difference area PA2 overlaps the first phase difference area PA1, as illustrated in (b) of FIG. 2C.

When the direction θ1 of the sound source 40 of a target sound is a positive direction and when θ1=near-zero degrees, as illustrated in (a) of FIG. 2D, it may be assumed that the direction of arrival of noise picked up by the microphone array 2 (the direction of the sound source 41) is also nearly zero degrees. In this case, for example, the second phase difference area PA2 may be included in the first phase difference area PA1, as illustrated in (b) of FIG. 2D.

FIGS. 2A to 2D are merely examples of settings of the first phase difference area PA1 and the second phase difference area PA2. It is possible to set the first phase difference area PA1 and the second phase difference area PA2 as appropriate, according to, for example, the direction θ1 of the sound source 40 of a target sound as viewed from the microphone array 2, the direction of arrival of noise, or a type of target sound or a type of noise. When the first phase difference area PA1 and the second phase difference area PA2 are set, for example, a user inputs, through the phase-difference-area setting unit 109, values that specify the directions of the sound sources 40 and 41 and a range of a phase difference, so as to perform the settings, the directions of the sound sources 40 and 41 being references of the respective phase difference areas. For example, the first phase difference area PA1 and the second phase difference area PA2 may be selected from among a plurality of types of combinations of the phase difference areas PA1 and PA2 that are provided in advance, so as to perform the settings of them.

If the microphone array 2 connected to the noise suppressing apparatus 1 is arranged at a predetermined position, the first phase difference area PA1 and the second phase difference area PA2 are set, and the operation of the noise suppressing apparatus 1 is started, the noise suppressing apparatus 1 starts receiving a sound input signal coming from the microphone array 2. The reception of a sound input signal is performed by the signal receiver 101. The signal receiver 101 divides each of a received first sound input signal and a received second sound input signal into units (into frames) for processing noise suppression, and combines simultaneous frames into a set so as to transmit the set to the signal transformer 102. On the basis of the set of simultaneous frames, the noise suppressing apparatus 1 performs noise suppressing processing illustrated in FIG. 3.

Figure 3:
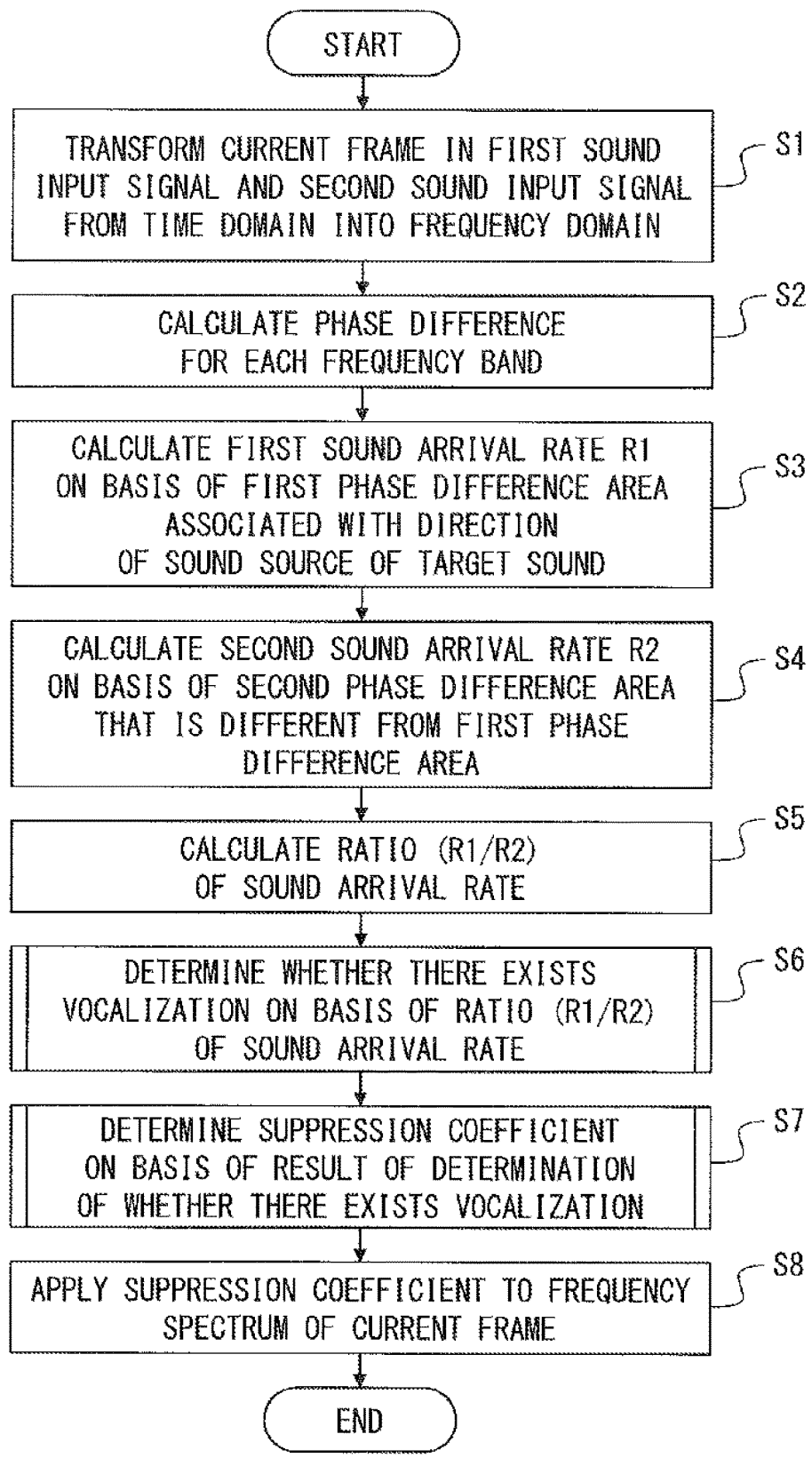
FIG. 3 is a flowchart that illustrates noise suppressing processing according to the first embodiment.

FIG. 3 is a flowchart that illustrates noise suppressing processing according to the first embodiment.

In the noise suppressing processing, first, the noise suppressing apparatus 1 transforms a frame that is a processing target (hereinafter also referred to as a "current frame") in the first sound input signal and the second sound input signal from a time domain into a frequency domain (Step S1). The process of Step S1 is performed by the signal transformer 102. The signal transformer 102 transforms each of the sound input signals of the processing target frame into a frequency spectrum including a phase spectrum, using, for example, a Fast Fourier Transform. The signal transformer 102 transmits a set of frequency spectra to the phase difference calculator 103. Further, the signal transformer 102 causes the set of frequency spectra to be held in, for example, the output signal generator 108 or a buffer (not illustrated).

Next, the phase difference calculator 103 calculates a phase difference for each frequency band on the basis of a phase spectrum in a set of frequency spectra (Step S2). The phase difference calculator 103 transmits the calculated phase difference to the sound-arrival-rate calculator 104. Further, the phase difference calculator 103 causes the calculated phase difference to be held in the suppression coefficient determination unit 107 or a buffer (not illustrated).

Next, the first arrival-rate calculator 104A of the sound-arrival-rate calculator 104 calculates a first sound arrival rate R1 on the basis of a first phase difference area PA1 associated with a direction of a sound source of a target sound (Step S3). The first arrival-rate calculator 104A reads the first phase difference area PA1 from the phase-difference-area storage 120, and calculates the first sound arrival rate R1 on the basis of the first phase difference area PA1 and the phase difference. For example, the first sound arrival rate R1 is calculated on the basis of a total number of frequency bands (a frequency division number) in a frequency spectrum of the processing target frame and on the basis of the number of frequency bands in which the phase difference is included in the first phase difference PA1.

Next, the second arrival-rate calculator 104B of the sound-arrival-rate calculator 104 calculates a second sound arrival rate R2 on the basis of a second phase difference area PA2 that is different from the first phase difference area PA1 (Step S4). The second arrival-rate calculator 104B reads the second phase difference area PA2 from the phase-difference-area storage 120, and calculates the second sound arrival rate R2 on the basis of the second phase difference area PA2 and the phase difference. For example, the second sound arrival rate R2 is calculated on the basis of a total number of frequency bands in a frequency spectrum of the processing target frame and on the basis of the number of frequency bands in which the phase difference is included in the second phase difference area PA2.

The processes of Step S3 and Step S4 may be performed in reverse order or in parallel. When it terminates the processes of Step S3 and Step S4, the sound-arrival-rate calculator 104 transmits the calculated first sound arrival rate R1 and the calculated second sound arrival rate R2 to the dissimilarity calculator 105.

Next, the dissimilarity calculator 105 calculates a ratio (R1/R2) of the first sound arrival rate R1 and the second sound arrival rate R2 as a value that represents a level of difference between the first sound arrival rate R1 and the second sound arrival rate R2 (Step S5). The dissimilarity calculator 105 transmits the ratio (R1/R2) of a sound arrival rate which was calculated as a dissimilarity to the vocalization determination unit 106.

Next, the vocalization determination unit 106 determines whether there exists a vocalization in the current frame on the basis of the ratio (R1/R2) of a sound arrival rate (Step S6). For example, when the ratio (R1/R2) of a sound arrival rate is not less than a threshold, the vocalization determination unit 106 determines that the current frame includes a vocalization (that is, a sound from a sound source of a target sound). The vocalization determination unit 106 transmits a determination result to the suppression coefficient determination unit 107.

Next, the suppression coefficient determination unit 107 determines a suppression coefficient to be applied to the frequency spectrum of the current frame, on the basis of the result of the determination of whether there exists a vocalization (Step S7). For example, the suppression coefficient determination unit 107 determines a suppression coefficient to be applied for each frequency band, on the basis of the phase difference. The suppression coefficient determination unit 107 outputs the determined suppression coefficient to the output signal generator 108.

Next, the output signal generator 108 applies the suppression coefficient to the frequency spectrum of the current frame in the first sound input signal, so as to generate a frame of a sound signal in which a noise component has been suppressed (Step S8). For example, the output signal generator 108 applies the suppression coefficient determined by the suppression coefficient determination unit 107 to a value of each frequency band in a frequency spectrum obtained by transforming the current frame of the first sound input signal (that is, it multiplies the value by the suppression coefficient). This results in a suppression of a noise component included in the first sound input signal, and the noise suppressing processing on the current frame is terminated.

The noise suppressing apparatus 1 performs the processes of Steps S1 to S8 on each set of a frame of the first sound input signal and a frame of the second sound input signal. Here, the noise suppressing apparatus 1 may be configured such that the processes of Steps S1 to S8 are put in a pipeline to be performed.

After the process of Step S8, the output signal generator 108 performs an Inverse Fast Fourier Transform on the frequency spectrum to which the suppression coefficient has been applied, and transforms the signal in which a noise component has been suppressed from a frequency domain into a time domain. This results in generating a sound signal in which a noise component has been suppressed from the processing target frame in the first sound input signal. After that, the output signal generator 108 outputs, to the output device 3, the generated sound signal after the noise suppression for each frame or for each combination of several frames.

Figure 4B:
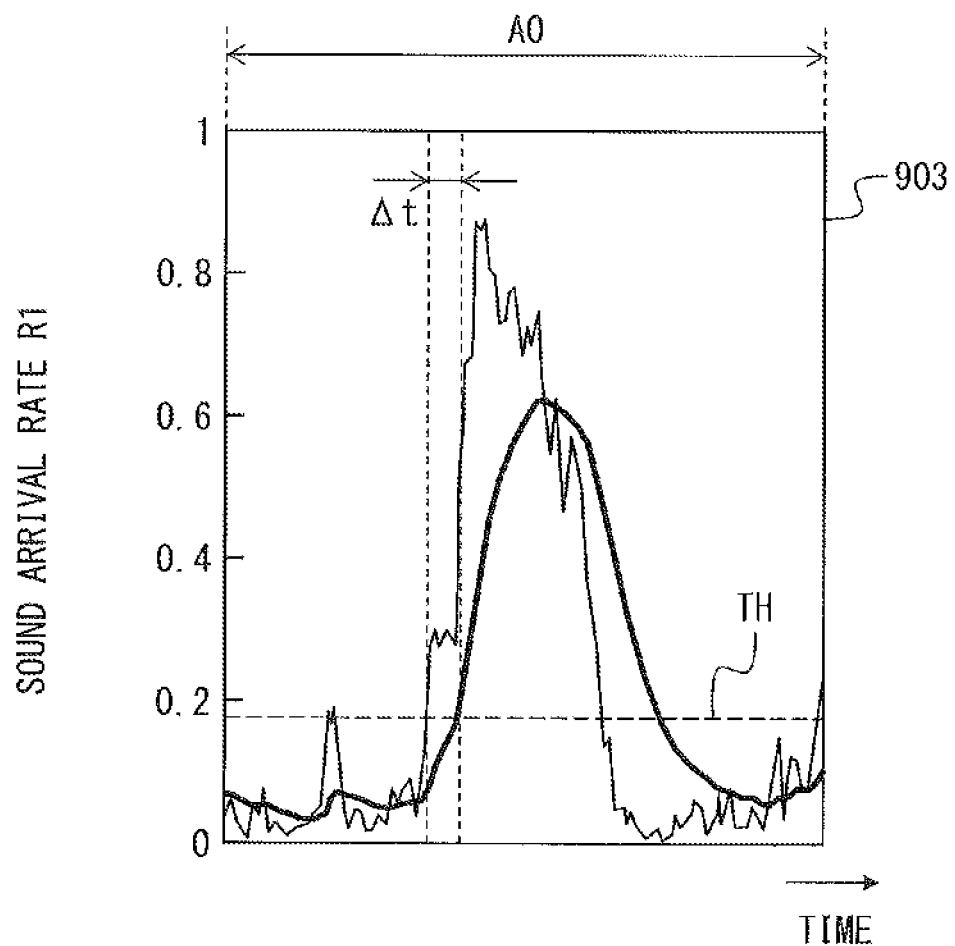
FIG. 4B is a graph obtained by enlarging an interval A0 in the graph 902 of FIG. 4A.

FIG. 4A is a set of graphs that explain a relationship between a sound input signal and a sound arrival rate. FIG. 4B is a graph obtained by enlarging an interval A0 in the graph 902 of FIG. 4A.

A graph 901 of FIG. 4A illustrates an example of a waveform of a first sound input signal. The first sound input signal includes a sound from the sound source 40 of a target sound and a sound (noise) from another sound source. In the first sound input signal illustrated in the graph 901, six intervals A1 to A6 are intervals that include a sound (a vocalization) from a sound source of a target sound. The second sound input signal has a waveform that is substantially identical to that of the first sound input signal, and includes a sound from the sound source 40 of a target sound and a sound (noise) from another sound source. For example, the first sound arrival rate R1 obtained by performing the processes of Steps S1 to S3 on the first sound input signal illustrated in the graph 901 has a time variation as indicated by a fine solid line in a graph 902 of FIG. 4A.

When it is determined whether there exists a vocalization on the basis of only the first sound arrival rate R1, the noise suppressing apparatus 1 determines that there exists a vocalization in a processing target frame if a first sound arrival rate R1 in the processing target frame is not less than a threshold TH.

As can be seen from the graph 902, the first sound arrival rate R1 is not less than the threshold TH in all of the actual vocalization intervals A1 to A6 in the sound input signal illustrated in the graph 901. However, with respect to the first sound arrival rate R1 illustrated in the graph 902, in an interval that is not a vocalization interval (a non-vocalization interval), there also exists a peak and several intervals in which the first sound arrival rate R1 is not less than the threshold TH. Thus, when it has been determined that there exists a vocalization on the basis of only the first sound arrival rate R1, noise will be suppressed under the assumption that there exists several vocalization intervals in an interval that is actually a non-vocalization interval when noise suppressing processing is performed. Therefore, when, so as to suppress noise, it is determined whether there exists a vocalization on the basis of only the first sound arrival rate R1, there occurs residual noise in a non-vocalization interval. Thus, for example, when a speech recognition is performed on a sound signal in which it has been determined whether there exists a vocalization (a vocalization interval) on the basis of only the first sound arrival rate R1 and noise has been suppressed, there may occur a source error due to residual noise being falsely determined to be a vocalization interval.

Further, for example, if the first sound arrival rate R1 is time-smoothed in order to reduce the above-described source error, the time-smoothed first sound arrival rate R1 has a time variation as indicated by a bold solid line in the graph 902. In other words, if the first sound arrival rate R1 is time-smoothed, it is possible to reduce residual noise in a non-vocalization interval.

However, when the first sound arrival rate R1 is time-smoothed, the time-smoothing is performed on the basis of the time-variation of the first sound arrival rate R1 in a plurality of frames. Thus, when the first sound arrival rate R1 is time-smoothed, a time $\Delta t$ of a delay occurs at a time at which the first sound arrival rate R1 is not less than the threshold TH, for example, as illustrated in a graph 903 of FIG. 4B. In the graph 903 of FIG. 4B, the fine solid line indicates the time-variation of the first sound arrival rate R1 before it is time-smoothed, and the bold solid line indicates the time-variation of the first sound arrival rate R1 after it is time-smoothed. In other words, when the first sound arrival rate R1 is time-smoothed, a beginning of a word may be interrupted due to a start time of a vocalization interval based on the first sound arrival rate R1 being delayed from an actual start time.

On the other hand, as described above, in the noise suppressing processing according to the present embodiment, it is determined whether there exists a vocalization on the basis of a dissimilarity between the first sound arrival rate R1 and the second sound arrival rate R2 (Steps S3 to S6). An example of setting the first phase difference area PA1 and the second phase difference area PA2 when noise suppressing processing is performed on the sound input signal illustrated in the graph 901 of FIG. 4A, and an example of a dissimilarity calculated in the noise suppressing processing are described below.

Figure 6:
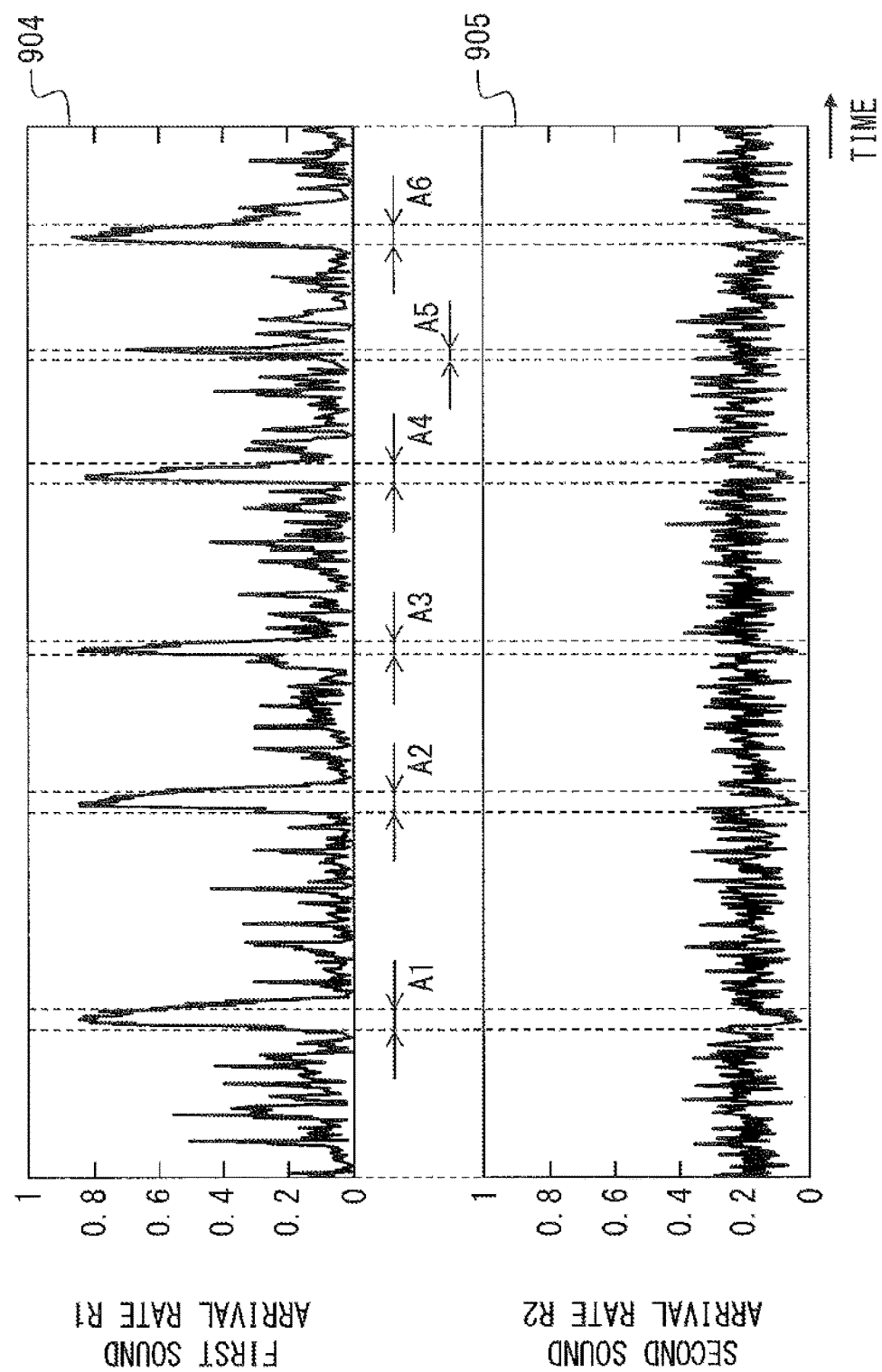
FIG. 6 is a set of graphs that illustrate time-variations of a first sound arrival rate and a second sound arrival rate.
Figure 7:
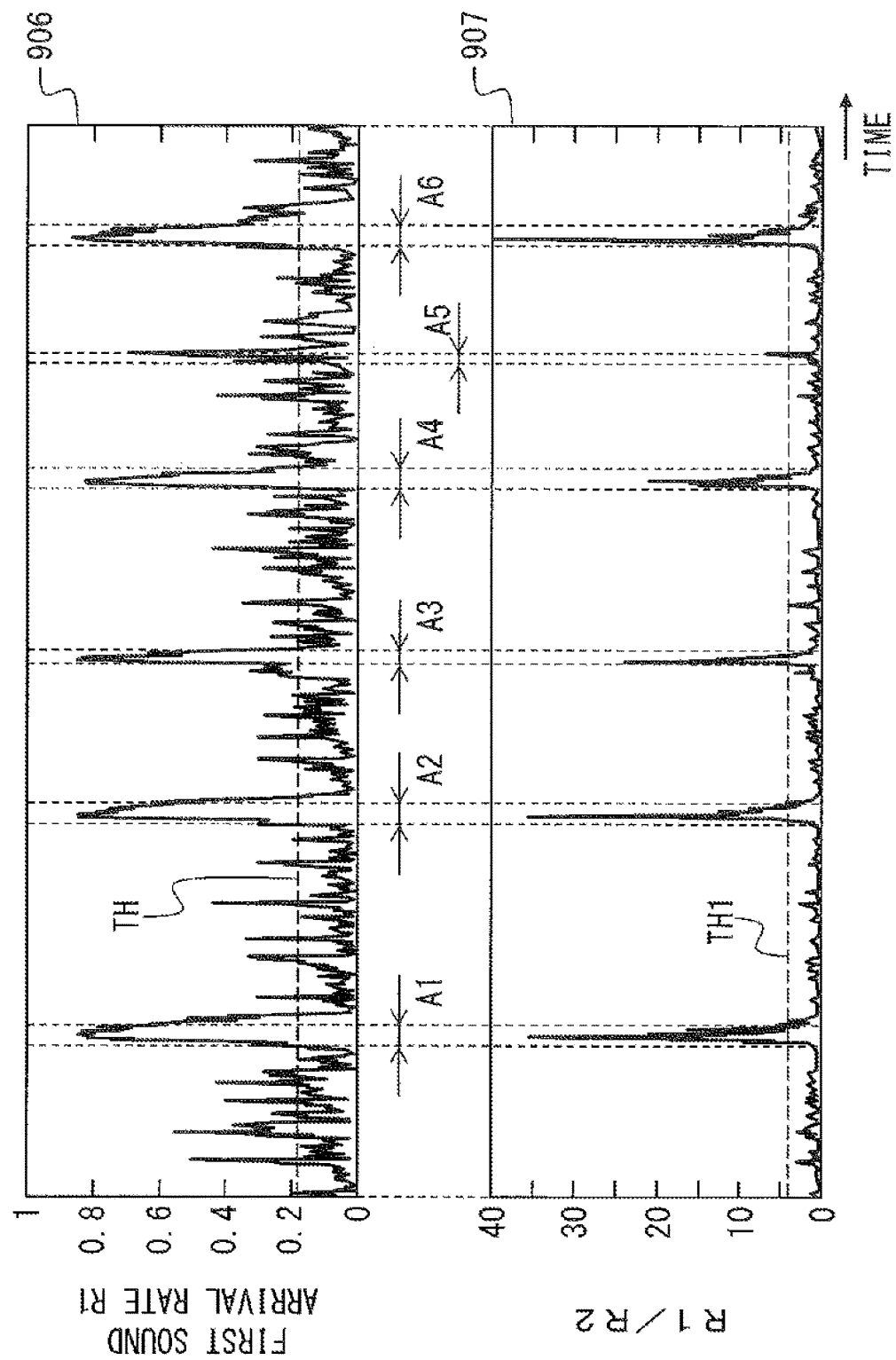
FIG. 7 is a set of graphs that compare the first sound arrival rate with a ratio of a sound arrival rate.

FIG. 5 illustrates an example of setting the first phase difference area and the second phase difference area in the noise suppressing processing according the first embodiment. FIG. 6 is a set of graphs that illustrate time-variations of the first sound arrival rate and the second sound arrival rate. FIG. 7 is a set of graphs that compare the first sound arrival rate with a ratio of a sound arrival rate. FIG. 8 is a set of graphs that compare waveforms of a sound signal before and after the noise suppressing processing.

For example, the first phase difference area PA1 and the second phase difference area PA2 as illustrated in FIG. 5 are set when the noise suppressing processing according to the present embodiment is performed. The combination of the first phase difference area PA1 and the second phase difference area PA2 illustrated in FIG. 5 corresponds to the above-described second example (see (b) of FIG. 2B), and the first phase difference area PA1 is set on the basis of the direction θ1 of the sound source 40 of a target sound. The second phase difference area PA2 is situated away from the first phase difference area PA1.

For example, the first sound arrival rate R1 is calculated on the basis of a total number of frequency bands (a frequency division number) in a frequency spectrum of a processing target frame and on the basis of the number of frequency bands in which a phase difference is included in the first phase difference PA1. As described above, the first phase difference area PA1 is a phase difference area that includes the direction in which there exists the sound source 40 of a target sound. Thus, for example, the first sound arrival rate R1 has a time variation as illustrated in a graph 904 of FIG. 6.

The time-variation of the first sound arrival rate R1 in the graph 904 is identical to the time-variation of the first sound arrival rate R1 illustrated in the graph 902 of FIG. 4A, in which there exists a peak of R1≈0.8 that corresponds to each of the vocalization intervals A1 to A6 and peaks of residual noise in a non-vocalization interval.

On the other hand, for example, the second sound arrival rate R2 is calculated on the basis of a total number of frequency bands in the frequency spectrum of the processing target frame and on the basis of the number of frequency bands in which the phase difference is included in the second phase difference PA2. Here, the second sound arrival rate R2 has a time variation as illustrated in a graph 905 of FIG. 6. The second phase difference area PA2 used to calculate the second sound arrival rate R2 is situated away from the first phase difference area PA1 that includes the direction in which there exists the sound source 40 of a target sound. Thus, almost all of the sounds of frequencies in which a phase difference calculated using a first sound input signal and a second sound input signal is included in the second phase difference area PA2 are noise. Therefore, in the second sound arrival rate R2, there does not exist a peak that represents a vocalization from the sound source of a target sound, and it varies approximately 0<R2<0.4 focusing around R2≈0.2.

Many of the peak values of residual noise in the first sound arrival rate R1 are not greater than 0.4, that is, not greater than half a peak value that represents a vocalization interval. Thus, if a ratio (R1/R2) of the first sound arrival rate R1 and the second sound arrival rate R2 is calculated, the ratio (R1/R2) of a sound arrival rate has a time variation as illustrated in a graph 907 of FIG. 7.

A value of a peak that occurs in a non-vocalization interval of the first sound arrival rate R1 is smaller than a peak value of a vocalization interval, and has a small difference from the second sound arrival rate R2. Thus, if the ratio (R1/R2) of the first sound arrival rate R1 and the second sound arrival rate R2 is calculated, the ratio (R1/R2) in a non-vocalization interval has a small value closer to one, while the ratio (R1/R2) in a vocalization interval has a value greater than one. Therefore, with respect to the ratio (R1/R2) of a sound arrival rate, a difference between a peak value that represents a vocalization interval and a peak value in a non-vocalization interval (a peak which may be a coefficient of residual noise) is more significant than a difference in a peak value in the distribution of the first sound arrival rate R1 illustrated in a graph 906 of FIG. 7. Further, if the threshold TH1 illustrated in the graph 907 of FIG. 7 is set with respect to the distribution of the ratio (R1/R2) of a sound arrival rate, it is possible to easily distinguish a peak of a vocalization interval from a peak of a non-vocalization interval which may be a coefficient of residual noise.

Thus, if it is determined whether there exists a vocalization on the basis of the ratio (R1/R2) of the first sound arrival rate R1 and the second sound arrival rate R2, it is possible to reduce residual noise that occurs in a non-vocalization interval. Therefore, if, so as to suppress noise, it is determined whether there exists a vocalization on the basis of the ratio (R1/R2) of a sound arrival rate, it is possible to reduce, for example, a source error due to residual noise when a speech recognition has been performed on a sound signal after the noise suppression.

Further, the ratio (R1/R2) of the first sound arrival rate R1 and the second sound arrival rate R2 enhances a peak of a vocalization interval in the first sound arrival rate R1. Thus, when the ratio (R1/R2) of the first sound arrival rate R1 and the second sound arrival rate R2 is used, a delay that occurs at a time (frame) at which a sound arrival rate is not less than the threshold TH1, that is, a delay of a start time of a vocalization, is less likely to occur, wherein the delay occurs when a sound arrival rate is time-smoothed.

For example, when a sound arrival rate is time-smoothed and a determination of a vocalization interval is performed so as to suppress noise with respect to a sound input signal from the microphone array 2 that includes the sound input signal illustrated in a graph 908 of FIG. 8, a sound signal having the waveform illustrated in a graph 909 of FIG. 8 is obtained. On the other hand, when the noise suppressing processing according to the present embodiment is performed with respect to the sound input signal from the microphone array 2 that includes the sound input signal illustrated in the graph 908 of FIG. 8, a sound signal having the waveform illustrated in a graph 910 of FIG. 8 is obtained. For example, there is a significant difference in waveform in the vocalization interval A5, comparing the waveform in the graph 909 of FIG. 8 with the waveform in the graph 910 of FIG. 8. Specifically, the waveform in the vocalization interval A5 when the time-smoothing has been performed does not have a peak that corresponds to a first peak in the waveform when the noise suppressing processing according to the present embodiment has been performed. Thus, the noise suppressing processing according to the present embodiment makes it possible to suppress an interruption of a beginning of a word in, for example, the vocalization interval A5.

As described above, the noise suppressing processing according to the present embodiment permits a detection of a correct vocalization interval in a noisy environment, which results in being able to reduce the occurrence of an interruption of a beginning of a word due to a delay in a start time of a vocalization and to reduce a source error due to residual noise of a non-vocalization interval.

In the above-described noise suppressing processing according to the present embodiment, a ratio (R1/R2) of a sound arrival rate is calculated as a value that represents a level of difference between a first sound arrival rate R1 and a second sound arrival rate R2. However, the value that represents the level of difference between the first sound arrival rate R1 and the second sound arrival rate R2 is not limited to this, and it may be, for example, a difference (R1−R2) between the first sound arrival rate R1 and the second sound arrival rate R2.

Next, an example of processing of determining a suppression coefficient in the noise suppressing processing according to the present embodiment is described with reference to FIGS. 9 and 10.

Figure 9:
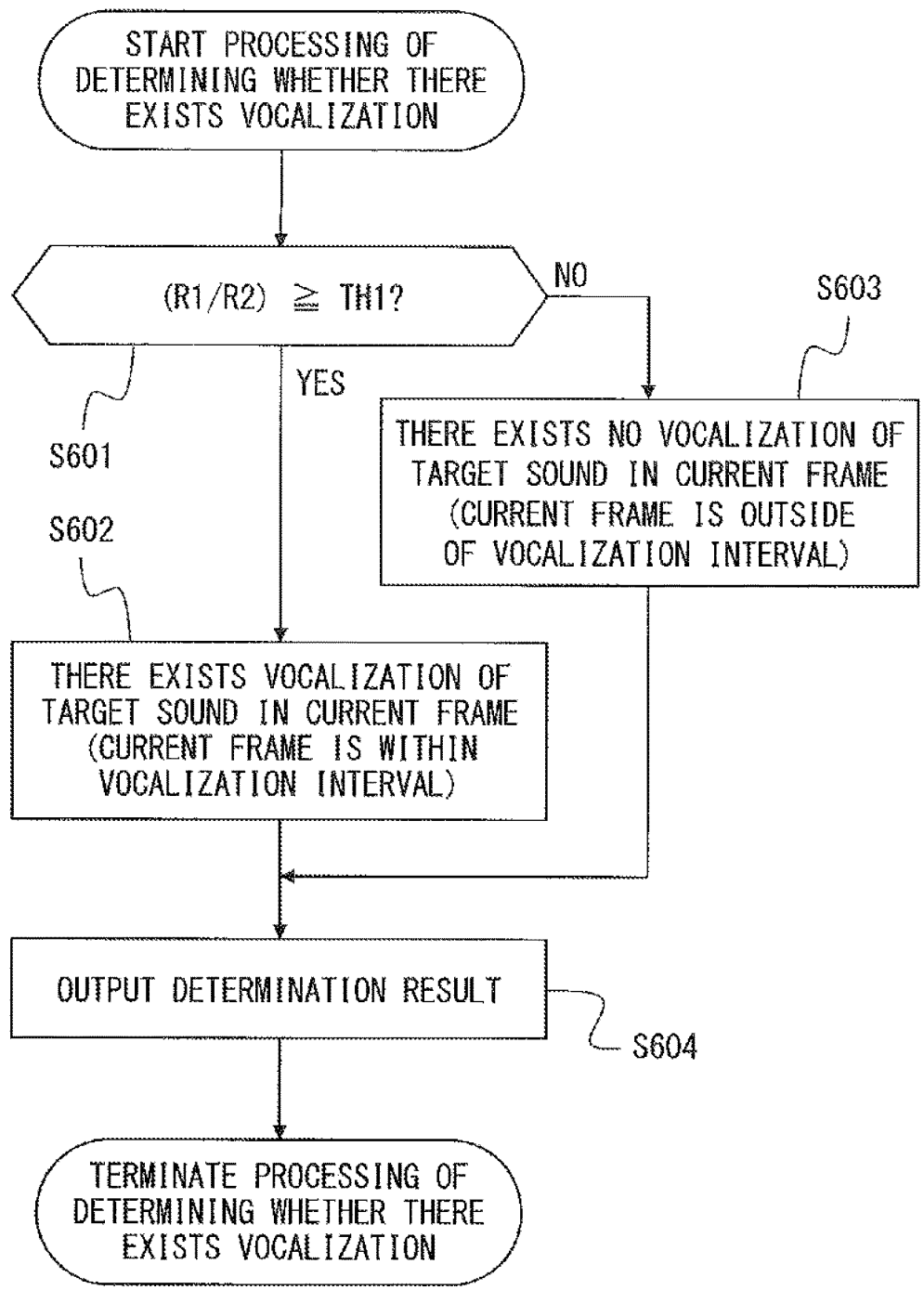
FIG. 9 is a flowchart that illustrates details of processing of determining whether there exists a vocalization.

FIG. 9 is a flowchart that illustrates details of processing of determining whether there exists a vocalization. FIG. 10 is a flowchart that illustrates details of processing of determining a suppression coefficient.

In the noise suppressing processing according to the present embodiment, the suppression coefficient determination unit 107 calculates a suppression coefficient to be applied to a frequency spectrum of a current frame (Step S7) on the basis of a determination result of the processing of determining whether there exists a vocalization (Step S6). Here, the suppression coefficient determination unit 107 changes a method of determining a suppression coefficient to be applied, according to whether the current frame is a vocalization interval.

In the processing of determining whether there exists a vocalization (Step S6), first, the vocalization determination unit 106 determines whether the ratio (R1/R2) of a sound arrival rate of the current frame is not less than the threshold TH1, as illustrated in FIG. 9 (Step S601).

When (R1/R2)TH1 (Step S601; YES), the vocalization determination unit 106 determines that there exists a vocalization in the current frame (Step S602). In other words, when (R1/R2)TH1, the vocalization determination unit 106 determines that the current frame is a frame within a vocalization interval that includes a sound (a vocalization) from a sound source of a target sound. On the other hand, when (R1/R2)<TH1 (Step S601; NO), the vocalization determination unit 106 determines that there exists no vocalization in the current frame (Step S603). In other words, when (R1/R2)<TH1, the vocalization determination unit 106 determines that the current frame is a frame outside of the vocalization interval (in a non-vocalization interval) that does not include a sound (a vocalization) from the sound source of the target sound.

After it determines whether there exists a vocalization in the current frame in Step S602 or S603, the vocalization determination unit 106 outputs (transmits) a determination result to the suppression coefficient determination unit 107 (Step S604), and terminates the determination processing on the current frame.

Figure 10:
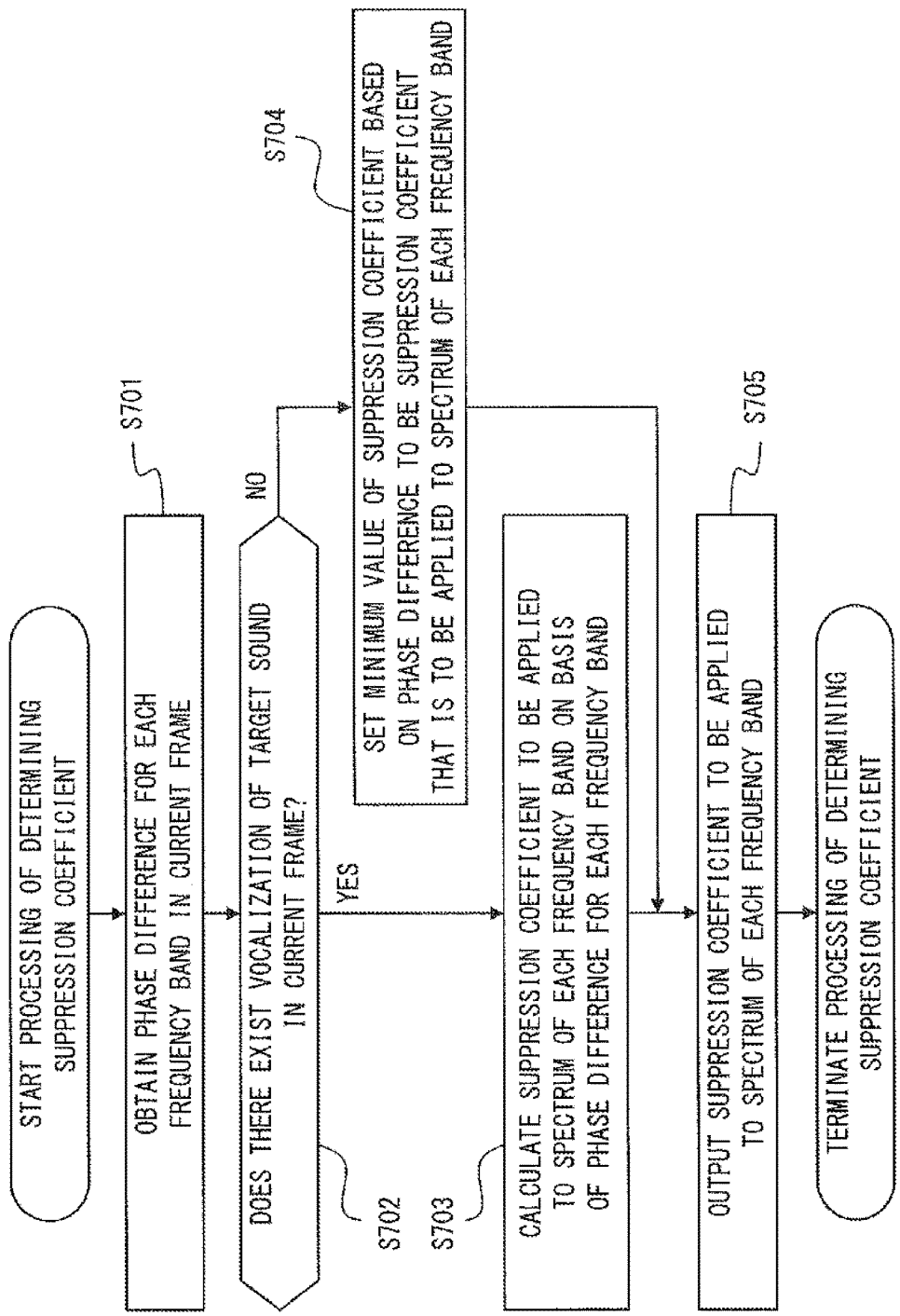
FIG. 10 is a flowchart that illustrates details of processing of determining a suppression coefficient.

When it receives a determination result from the vocalization determination unit 106, first, the suppression coefficient determination unit 107 obtains a phase difference for each frequency band in the current frame, as illustrated in FIG. 10 (Step S701).

Next, the suppression coefficient determination unit 107 determines whether there exists a vocalization in the current frame, on the basis of the determination result from the vocalization determination unit 106 (Step S702). When there exists a vocalization in the current frame (Step S702; YES), the suppression coefficient determination unit 107 calculates a suppression coefficient to be applied to each frequency band of a frequency spectrum, on the basis of the phase difference of each frequency band of the current frame (Step S703). On the other hand, when there exists no vocalization in the current frame (Step S702; NO), the suppression coefficient determination unit 107 determines a minimum value of a suppression coefficient based on the phase difference to be a suppression coefficient that is to be applied to each frequency band of a frequency spectrum of the current frame (Step S704).

After a suppression coefficient is determined in Step S703 or S704, the suppression coefficient determination unit 107 outputs (transmits), to the output signal generator 108, a suppression coefficient to be applied to each frequency band of a frequency spectrum of the current frame (Step S705), and terminates the processing of calculating a suppression coefficient.

FIG. 11 is a set of graphs that explain an example of a method for calculating a suppression coefficient for noise.

(a) of FIG. 11 illustrates an example of a first phase difference area PA1. As an example of the first phase difference area PA1, the graph of (a) of FIG. 11 illustrates a relationship between a frequency band when the direction θ1 of a sound source of a target sound is zero degrees and a phase difference by which it is determined that a sound has come from the sound source of the target sound. In this graph, it is assumed that, when a component in a frequency band f is included in the target sound, a phase difference in the frequency band f is in one of a range not less than DP2 and a range not greater than DP4.

(b) of FIG. 11 is a graph that illustrates a relationship between the phase difference in the frequency band f and a suppression coefficient to be applied to a power value of the frequency band f. In other words, it is assumed that, when the phase difference in the frequency band f is in one of a range not less than DP2 and a range not greater than DP4, a suppression coefficient to be applied to the power value of the frequency band f is G=1. Further, it is assumed that, when the phase difference in the frequency band f is in one of a range not greater than DP1 (DP1<DP2) or a range not less than DP5 (DP4<DP5), a suppression coefficient to be applied to the power value of the frequency band f is G=Gmin(<1).

Furthermore, it is assumed that, when the phase difference in the frequency band f is in one of a range between DP1 and DP2 and a range between DP4 and DP5, a suppression coefficient to be applied to the power value of the frequency band f is one of the values between 1 and Gmin.

The graph of (b) of FIG. 11 illustrates a range δ1(f) in which the phase difference is from DP2 to DP4 and a range δ2(f) in which the phase difference is from DP1 to DP5. However, the ranges δ1(f) and δ2(f) differ according to the frequency band f, and each of them becomes wider at a higher frequency. DP3, a central value in the graph of (b) of FIG. 11, varies according to a value of the direction θ1 of a sound source of a target sound.

In the noise suppressing processing according to the present embodiment, when there exists a vocalization in a current frame, the suppression coefficient determination unit 107 calculates a suppression coefficient on the basis of a relationship between a phase difference set for each frequency band f and a suppression coefficient. On the other hand, when there exists no vocalization in the current frame, the suppression coefficient determination unit 107 determines a minimum value Gmin to be a suppression coefficient that is to be applied to the frequency band f regardless of the phase difference.

As described above, if the minimum value Gmin is always determined to be a suppression coefficient that is to be applied to each frequency band, regardless of the phase difference, when a current frame is not a vocalization interval, it is possible to reduce musical noise.

The relationship between a phase difference and a suppression coefficient illustrated in (b) of FIG. 11 is merely an example, and for example, DP1=DP2, DP4=DP5 may be used. Further, for example, with respect to the relationship between a phase difference and a suppression coefficient, the relationship in an area in which the phase difference is small and the relationship in an area in which the phase difference is large may be asymmetric, the areas being bounded by the central value DP3. In other words, the relationship between a phase difference and a suppression coefficient is not limited to the relationship illustrated in (b) of FIG. 11, but (DP4−DP3)≠(DP3−DP2) or (DP2−DP1)≠(DP5−DP4) may be used.

Second Embodiment

Figure 12:
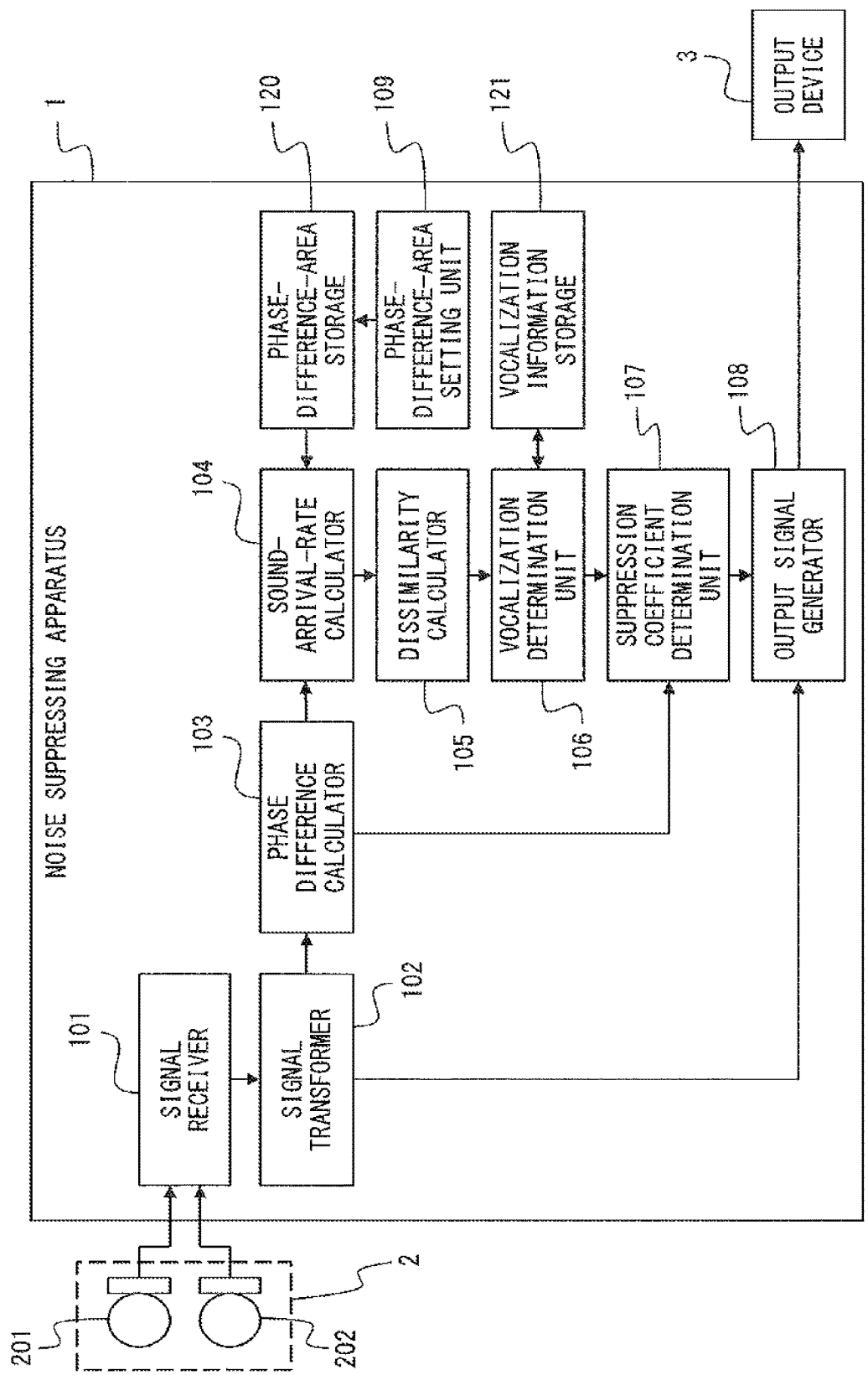
FIG. 12 illustrates a functional configuration of the noise suppressing apparatus according to a second embodiment.

FIG. 12 illustrates a functional configuration of the noise suppressing apparatus according to a second embodiment.

As illustrated in FIG. 12, the noise suppressing apparatus 1 according to the present embodiment includes the signal receiver 101, the signal transformer 102, the phase difference calculator 103, the sound-arrival-rate calculator 104, the dissimilarity calculator 105, the vocalization determination unit 106, the suppression coefficient determination unit 107, and the output signal generator 108.

The noise suppressing apparatus 1 further includes the phase-difference-area setting unit 109, the phase-difference-area storage 120, and a vocalization information storage 121.

The noise suppressing apparatus 1 according to the present embodiment is different from the noise suppressing apparatus 1 according to the first embodiment in the details of the processing of determining whether there exists a vocalization in the vocalization determination unit 106. The vocalization determination unit 106 of the noise suppressing apparatus 1 according to the present embodiment determines whether there exists a vocalization in a frame that is a current processing target (a current frame) on the basis of whether a previous frame that is prior to the current frame is a vocalization interval and on the basis of a sound arrival rate in the current frame. Information that indicates whether the previous frame is a vocalization interval is stored in the vocalization information storage 121. When it terminates a determination of whether there exists a vocalization with respect to the frame that is a current processing target, the vocalization determination unit 106 stores a determination result for the frame in the vocalization information storage 121. When it determines whether there exists a vocalization with respect to a next frame, the vocalization determination unit 106 reads and obtains a result of determination of whether there exists a vocalization, the result of determination having been stored in the vocalization information storage 121.

When its operation is started, the noise suppressing apparatus 1 according to the present embodiment starts receiving a sound input signal coming from the microphone array 2 (the first mike 201 and the second mike 202) and then performs the noise suppressing processing illustrated in FIG. 3. As in the first embodiment, the dissimilarity calculator 105 in the noise suppressing apparatus 1 according to the present embodiment calculates a ratio (R1/R2) of a sound arrival rate as a level of difference between a first sound arrival rate R1 and a second sound arrival rate R2 (Step S5). After it calculates the ratio (R1/R2) of a sound arrival rate, the dissimilarity calculator 105 transmits the first sound arrival rate R1 and the calculated ratio (R1/R2) of a sound arrival rate to the vocalization determination unit 106. When it obtains the first sound arrival rate R1 and the calculated ratio (R1/R2) of a sound arrival rate, the vocalization determination unit 106 performs processing illustrated in FIG. 13 as the processing of determining whether there exists a vocalization (Step S6).

Figure 13:
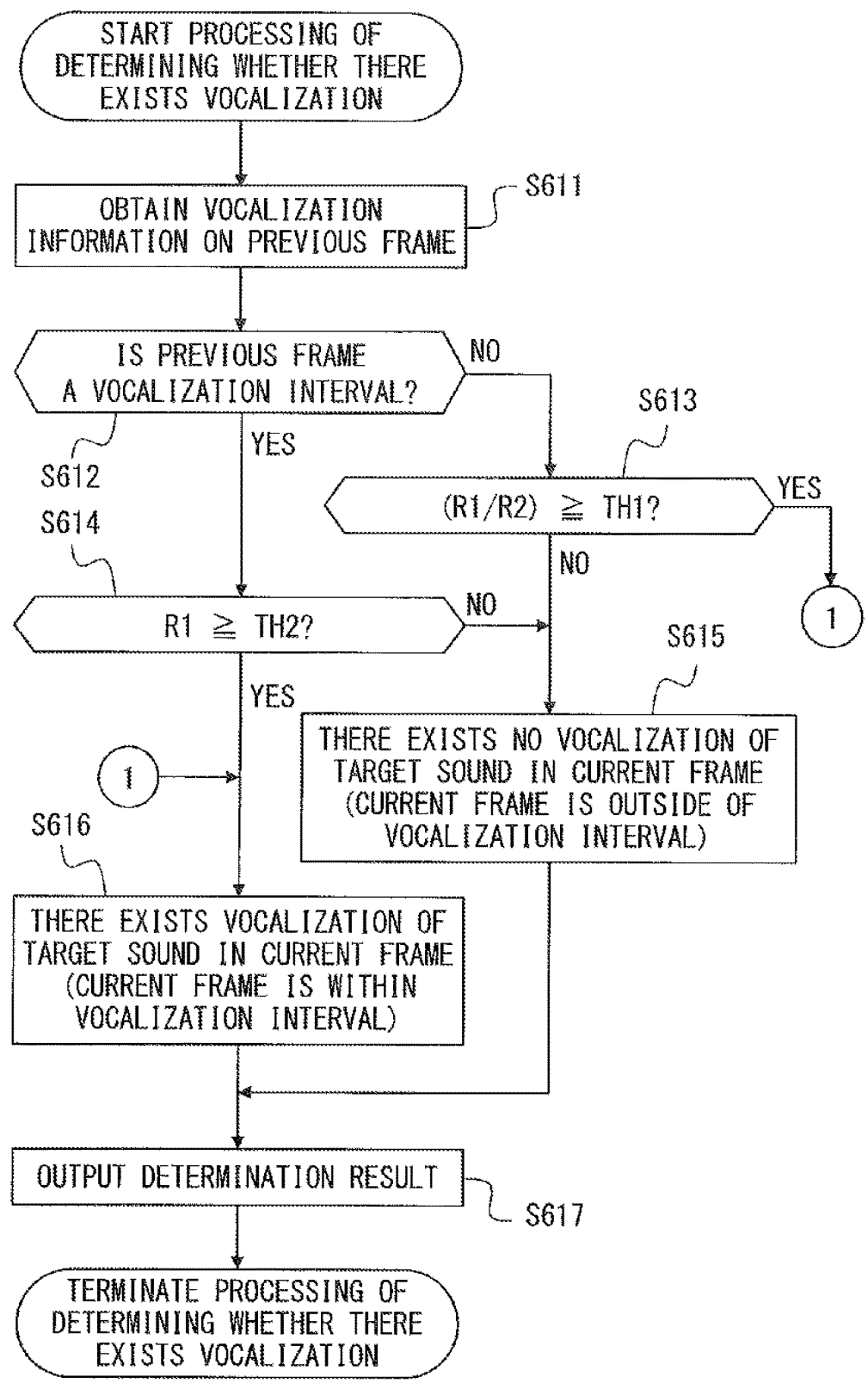
FIG. 13 is a flowchart that illustrates details of processing of determining whether there exists a vocalization according to the second embodiment.

FIG. 13 is a flowchart that illustrates details of processing of determining whether there exists a vocalization according to the second embodiment.

When it obtains the first sound arrival rate R1 in the frame that is a current processing target (the current frame) and the ratio (R1/R2) of a sound arrival rate from the dissimilarity calculator 105, the vocalization determination unit 106 starts performing processing illustrated in FIG. 13. In this processing, first, the vocalization determination unit 106 obtains vocalization information on a previous frame (Step S611). In Step S611, the vocalization determination unit 106 reads a result of determination of whether there exists a vocalization with respect to the previous frame from the vocalization information storage 121 as vocalization information on the previous frame.

Next, the vocalization determination unit 106 determines whether the previous frame is a vocalization interval (Step S612). When it is just after the noise suppressing apparatus 1 has started operating (that is, when the current frame is the first processing target frame) and when there is no vocalization information on the previous frame in the vocalization information storage 121, the vocalization determination unit 106 determines that the previous frame is a non-vocalization interval (not a vocalization interval).

When the previous frame is not a vocalization interval (Step S612; NO), next, the vocalization determination unit 106 determines whether the ratio (R1/R2) of a sound arrival rate in the current frame is not less than a first threshold TH1 (Step S613). When (R1/R2)<TH1 (Step S613; NO), the vocalization determination unit 106 determines that there exists no vocalization of a target sound in the current frame (that is, that the current frame is outside of the vocalization interval) (Step S615). On the other hand, when (R1/R2)TH1 (Step S613; YES), the vocalization determination unit 106 determines that there exists a vocalization of the target sound in the current frame (that is, that the current frame is within a vocalization interval) (Step S616).

When the previous frame is a vocalization interval (Step S612; YES), next, the vocalization determination unit 106 determines whether the first sound arrival rate R1 in the current frame is not less than a second threshold TH2 (Step S614). When R1≥TH2 (Step S614; YES), the vocalization determination unit 106 determines that there exists a vocalization of the target sound in the current frame (that is, that the current frame is within a vocalization interval) (Step S616). On the other hand, when R1<TH2 (Step S614; NO), the vocalization determination unit 106 determines that there exists no vocalization of the target sound in the current frame (that is, that the current frame is outside of a vocalization interval) (Step S615).

When it has determined in Steps S612 to S616 whether there exists a vocalization of the target sound in the current frame, the vocalization determination unit 106 outputs a determination result (Step S617) and terminates the processing of determining whether there exists a vocalization in the current frame. In Step S617, the vocalization determination unit 106 performs, as the processing of outputting the determination result, processing of transmitting the determination result to the suppression coefficient determination unit 107 and processing of storing the determination result in the vocalization information storage 121.

Figure 14:
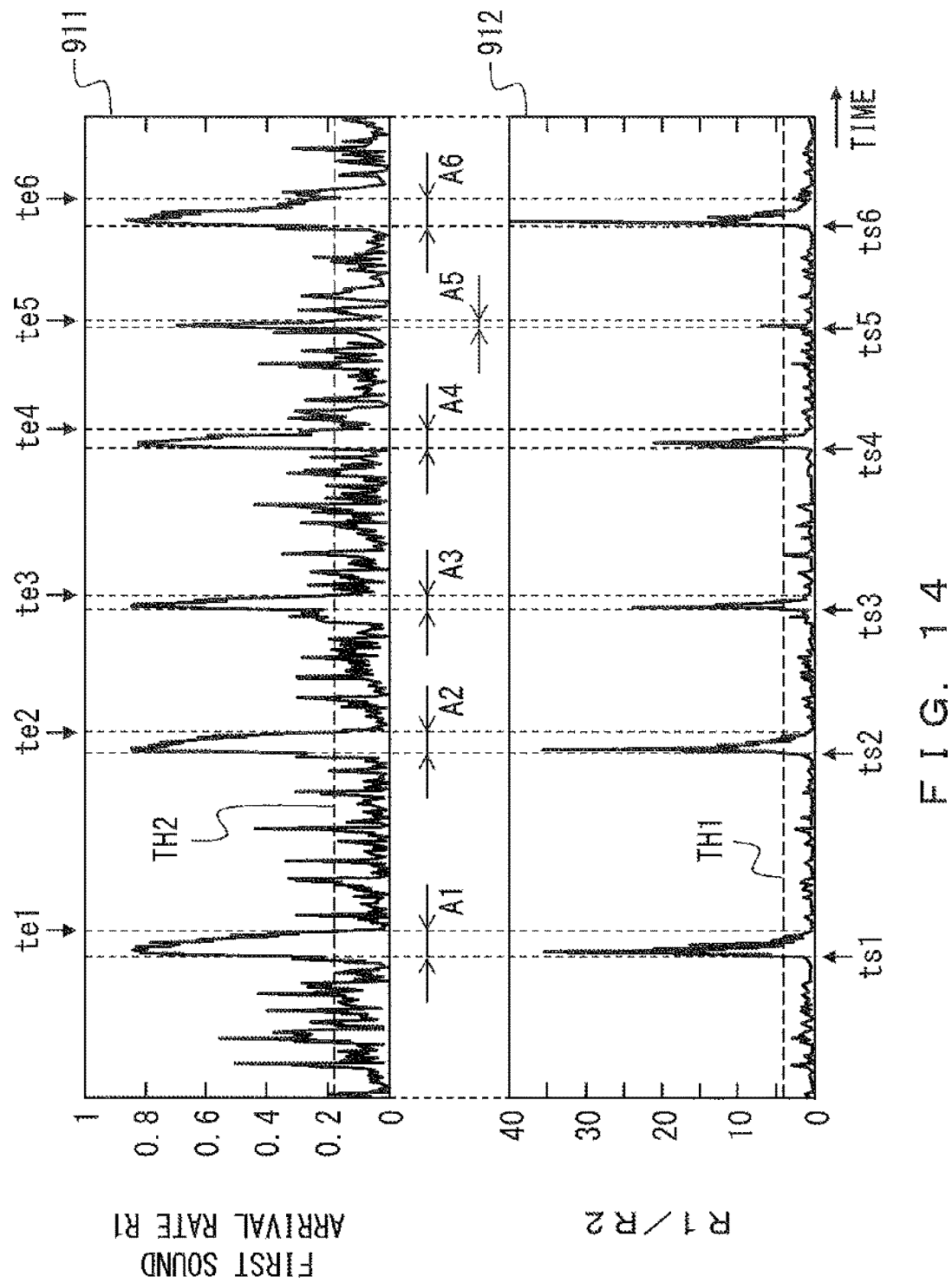
FIG. 14 is a set of graphs that explain a vocalization interval in the noise suppressing processing according to the second embodiment.

FIG. 14 is a set of graphs that explain a vocalization interval in the noise suppressing processing according to the second embodiment.

As described above, in the noise suppressing processing according to the present embodiment, a method for determining whether there exists a vocalization in a current frame is changed according to whether a previous frame is a vocalization interval. When the previous frame is not a vocalization interval, the vocalization determination unit 106 determines whether there exists a vocalization of a target sound in a current frame on the basis of the ratio (R1/R2) of a sound arrival rate and on the basis of the first threshold TH1. Thus, in the noise suppressing processing according to the present embodiment, times ts1, ts2, ts3, ts4, ts5, and ts6 at which the ratio (R1/R2) of a sound arrival rate is changed from (R1/R2)<TH1 to (R1/R2)=TH1 are start times of vocalization intervals A1, A2, A3, A4, A5, and A6, respectively, as illustrated in a graph 912 of FIG. 14. This processing is similar to the processing of determining whether there exists a vocalization in the noise suppressing processing according to the first embodiment (see FIG. 9). Thus, the noise suppressing processing according to the present embodiment makes it possible to reduce residual noise and to reduce the occurrence of an interruption of a beginning of a word as in the case of the noise suppressing processing according to the first embodiment.

When the previous frame is a vocalization interval, the vocalization determination unit 106 of the noise suppressing apparatus 1 according to the present embodiment determines whether there exists a vocalization of the target sound in the current frame on the basis of the first sound arrival rate R1 and the second threshold TH2. In other words, in the noise suppressing processing according to the present embodiment, it is determined whether the current frame is within a vocalization interval on the basis of whether the first sound arrival rate R1 of a graph 911 of FIG. 14 is not less than the second threshold TH2 after the start time ts1 of the vocalization interval A1. Then, as illustrated in the graph 911 of FIG. 14, the time te1 at which the first sound arrival rate R1 is changed from R1=TH2 to R1<TH2 is a finish time of the vocalization interval A1. Likewise, the times te2, te3, te4, te5, and te6 at which the first sound arrival rate R1 is changed from R1=TH2 to R1<TH2 are finish times of the vocalization intervals A2, A3, A4, A5, and A6, respectively.

The first sound arrival rate R1 for the first phase difference area PA1 that includes a direction of a sound source of a target sound continues to have a value larger than the second threshold TH2 in a vocalization interval. Thus, it is possible to reduce the occurrence of an interruption of a beginning of a word if it is determined whether a vocalization interval is finished on the basis of the first sound arrival rate R1 and the second threshold TH2, as in the present embodiment.

In the above-described noise suppressing processing according to the present embodiment, a ratio (R1/R2) of a sound arrival rate is calculated as a value that represents a level of difference between a first sound arrival rate R1 and a second sound arrival rate R2. However, the value that represents the level of difference between the first sound arrival rate R1 and the second sound arrival rate R2 is not limited to this, and it may be, for example, a difference (R1−R2) between the first sound arrival rate R1 and the second sound arrival rate R2.

Third Embodiment

In the present embodiment, a speech recognition apparatus that performs a speech recognition on the basis of a sound signal in which noise has been suppressed by the noise suppressing processing according to the first embodiment will be described.

Figure 15:
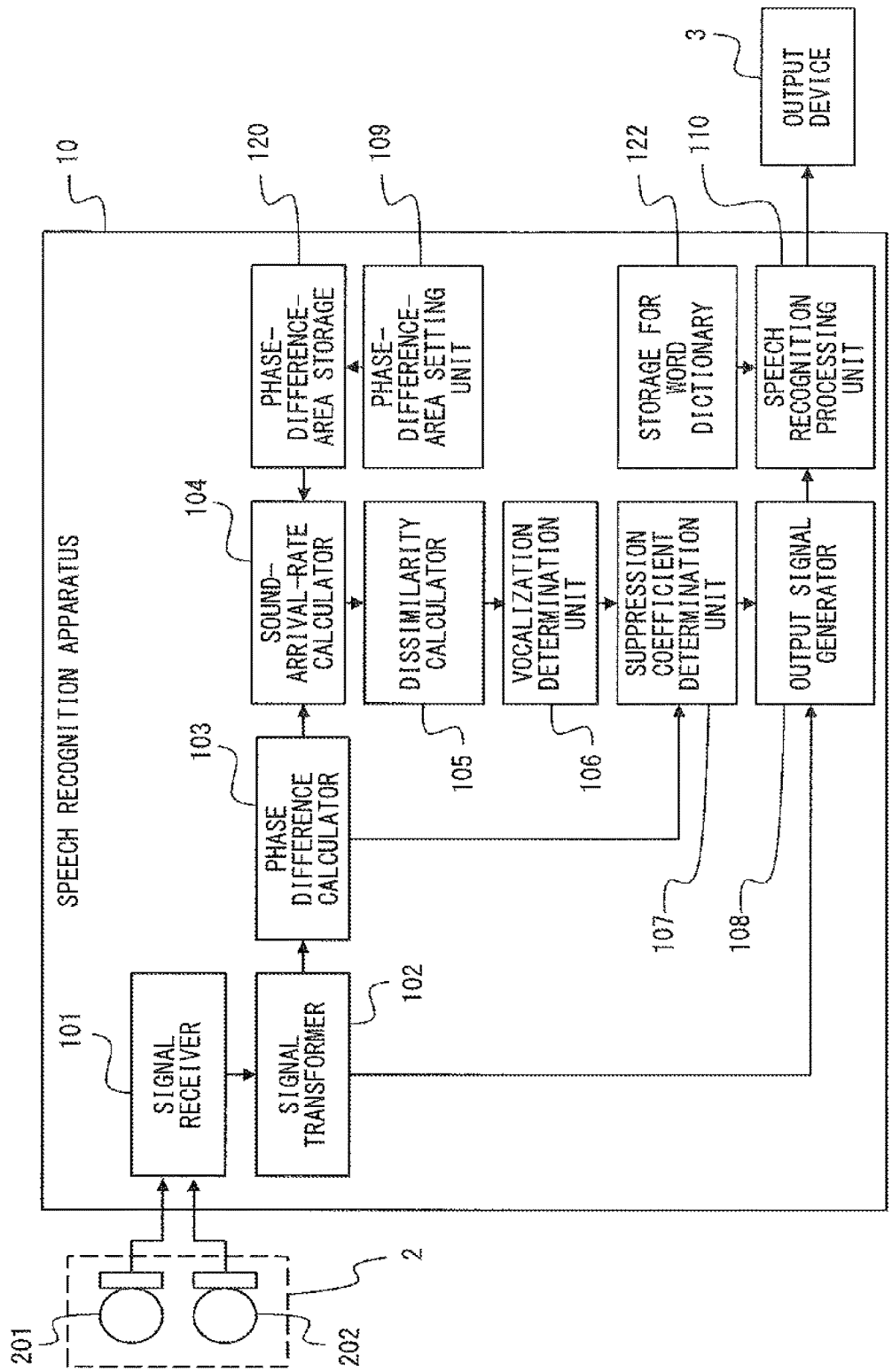
FIG. 15 illustrates a functional configuration of a speech recognition apparatus according to a third embodiment.

FIG. 15 illustrates a functional configuration of a speech recognition apparatus according to a third embodiment.

As illustrated in FIG. 15, a speech recognition apparatus 10 according to the present embodiment includes the signal receiver 101, the signal transformer 102, the phase difference calculator 103, the sound-arrival-rate calculator 104, the dissimilarity calculator 105, the vocalization determination unit 106, the suppression coefficient determination unit 107, and the output signal generator 108. The speech recognition apparatus 10 further includes the phase-difference-area setting unit 109 and the phase-difference-area storage 120. Moreover, the speech recognition apparatus 10 includes a speech recognition processing unit 110 and a storage 122 for a word dictionary.

The signal receiver 101, the signal transformer 102, the phase difference calculator 103, the sound-arrival-rate calculator 104, the dissimilarity calculator 105, the vocalization determination unit 106, the suppression coefficient determination unit 107, and the output signal generator 108 of the speech recognition apparatus 10 each have the function described in the first embodiment. Likewise, the phase-difference-area setting unit 109 and the phase-difference-area storage 120 of the speech recognition apparatus 10 each have the function described in the first embodiment.

On the basis of a sound signal after a noise suppression and a word dictionary for speech recognition, the speech recognition processing unit 110 performs a speech recognition on the sound signal after a noise suppression, wherein the sound signal after a noise suppression is generated by the output signal generator 108 and the word dictionary has been stored in the storage 122 for a word dictionary. On the basis of the sound signal after a noise suppression and the word dictionary, the speech recognition processing unit 110 recognizes a word in a vocalization interval that is included in the sound signal so as to generate text data. The speech recognition processing performed by the speech recognition processing unit 110 may be any existing recognition processing. The speech recognition processing unit 110 outputs the text data generated by the speech recognition processing to the output device 3.

The microphone array 2 that includes the first mike 201 and the second mike 202 is connected to the speech recognition apparatus 10 according to the present embodiment. When the operations of the speech recognition apparatus 10 and the microphone array 2 are started, the speech recognition apparatus 10 receives inputs of a first sound input signal and a second sound input signal in the signal receiver 101 and performs the noise suppressing processing described in the first embodiment (see FIG. 3). The speech recognition apparatus 10 performs the speech recognition processing on an output signal (a sound signal) obtained by performing the noise suppressing processing, and outputs a recognition result (the generated text data) to the output device 3.

As described above, in the speech recognition apparatus 10 according to the present embodiment, a speech recognition is performed on a sound signal in which noise has been suppressed by the noise suppressing processing according to the first embodiment. In the case of the sound signal in which noise has been suppressed by the noise suppressing processing according to the first embodiment, it is possible to suppress the occurrence of an interruption of a beginning of a word, as described above. Further, in the case of the sound signal in which noise has been suppressed by the noise suppressing processing according to the first embodiment, it is possible to reduce residual noise that may cause a source error, as described above. Therefore, the present embodiment permits a reduction in an interruption of a beginning of a word and in a false recognition due to residual noise, so as to improve the accuracy of a speech recognition.

The speech recognition apparatus 10 that suppresses noise by the noise suppressing processing according to the first embodiment has been described in the present embodiment, but the speech recognition apparatus according to the embodiments of the present invention is not limited to this, and it may be configured to suppress noise by the noise suppressing processing according to the second embodiment.

Also in the speech recognition apparatus 10 according to the present embodiment, the value that represents a level of difference between a first sound arrival rate R1 and a second sound arrival rate R2 calculated by the dissimilarity calculator 105 is not limited to the ratio (R1/R2) of a sound arrival rate, and it may be, for example, a difference (R1−R2) in a sound arrival rate.

<Exemplary Application of Apparatus>

Next, exemplary applications of the noise suppressing apparatus 1 according to the first and second embodiments and the speech recognition apparatus according to the third embodiment are described.

Figure 16A:
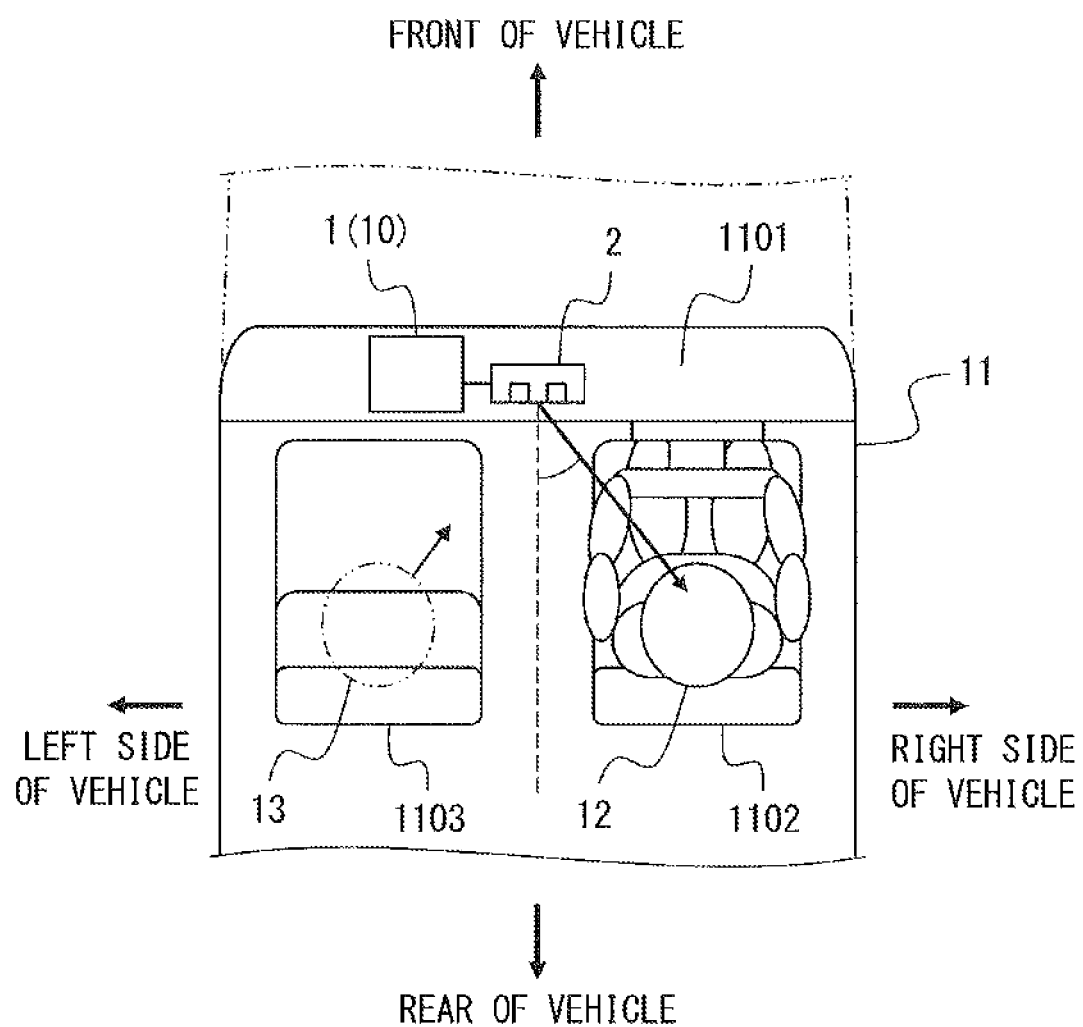
FIG. 16A is a diagram that illustrates a first exemplary application of the noise suppressing apparatus.

FIG. 16A is a diagram that illustrates a first exemplary application of the noise suppressing apparatus.

As the first exemplary application of the noise suppressing apparatus 1 (or the speech recognition apparatus 10) described above, FIG. 16A illustrates an example in which it is provided in a vehicle 11. The noise suppressing apparatus 1 or the speech recognition apparatus 10 provided in the vehicle 11 can be used for, for example, a sound input of a car navigation system or hands-free talking. For example, the microphone array 2 connected to the noise suppressing apparatus 1 or the speech recognition apparatus 10 is arranged at a part substantially central in a transverse direction of a dashboard 1101 of the vehicle 11. The microphone array 2, the noise suppressing apparatus 1, the speech recognition apparatus 10, or the like may be provided inside a housing of a car navigation system or a communication device such as a mobile handset.

The sound source of a target sound in the first exemplary application is, for example, a user (a driver) 12 sitting in a driver's seat 1102. Thus, in the first exemplary application, a first phase difference area PA1 is set under the assumption that a direction in which the head of the driver 12 is situated as viewed from the microphone array 2 is a direction of a sound source of a target sound. Further, in the first exemplary application, a vocalization or the like of a person 13 sitting in a passenger's seat 1103 may be noise. Thus, in the first exemplary application, for example, a second phase difference area PA2 is set with reference to a direction in which the head of the person 13 is situated as viewed from the microphone array 2.

Further, when a speaker is arranged on the rear side in a vehicle interior of the vehicle 11 and music or the like is output from the speaker, the music or the like may be noise. Thus, in the first exemplary application, the second phase difference area PA2 may be set with reference to a spreading of a sound from the speaker of the rear part of the vehicle interior.

Furthermore, for example, oncoming vehicles pass on the right side of the vehicle 11 when the vehicle 11 is traveling on a road on which drivers keep to the left side. Thus, an engine sound or the like produced by the oncoming vehicle when the oncoming vehicle passes the vehicle 11 may be noise. Therefore, in the first exemplary application, the second phase difference area PA2 may be set with reference to, for example, noise coming from the right side of the vehicle.

Figure 16B:
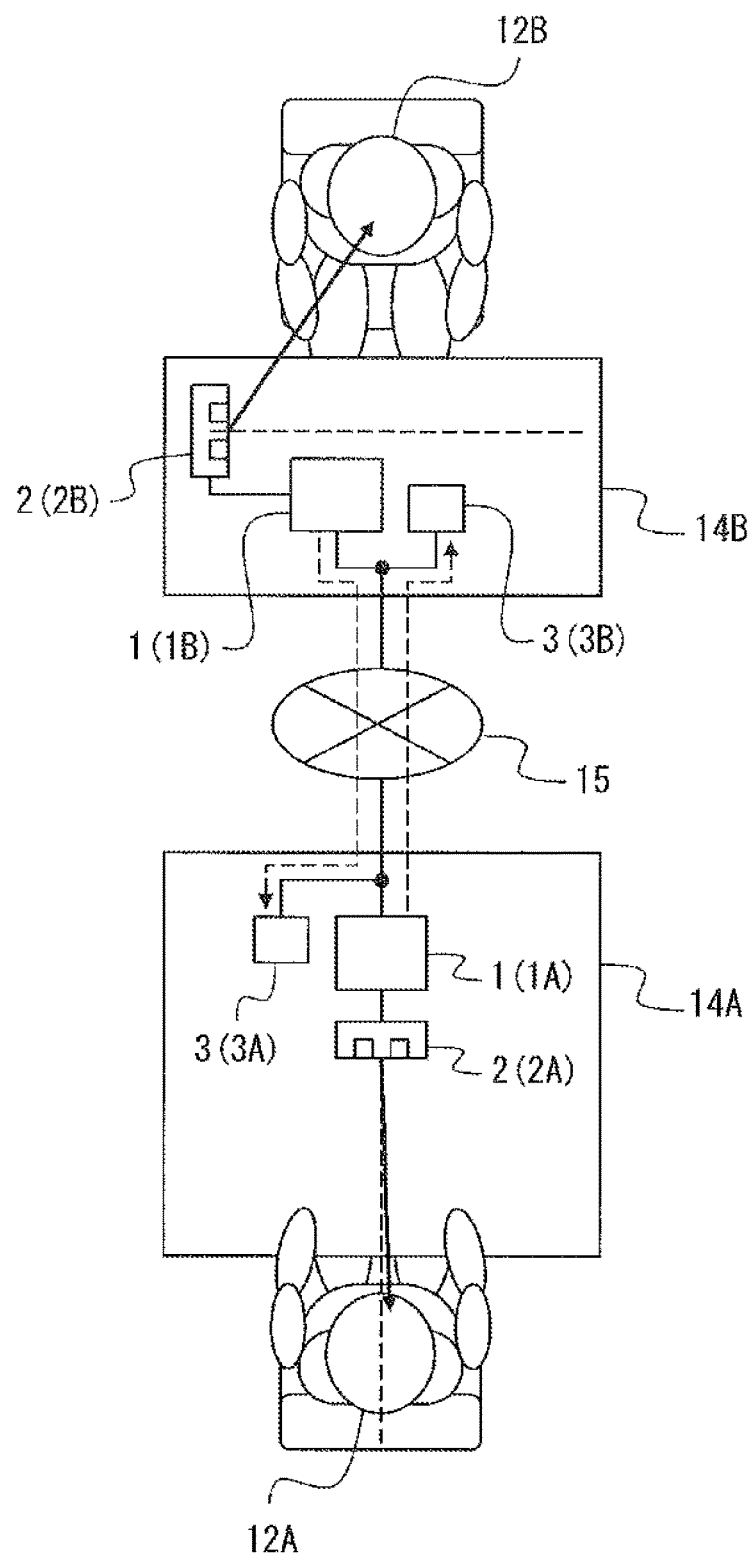
FIG. 16B is a diagram that illustrates a second exemplary application of the noise suppressing apparatus.

FIG. 16B is a diagram that illustrates a second exemplary application of the noise suppressing apparatus.

As the second exemplary application of the noise suppressing apparatus 1 described above, FIG. 16B illustrates an example of applying it to a conference call system. In a conference call system, for example, a first telephone communication device (not illustrated) that includes a first noise suppressing apparatus 1A and a second telephone communication device (not illustrated) that includes a second noise suppressing apparatus 1B are connected to each other through a communication network 15 such as the Internet or a telephone network. The first telephone communication device and the second telephone communication device each include a processing unit that performs predetermined processing on a sound signal received from a noise suppressing apparatus provided in a counterpart's telephone communication device, and the output device 3 (3A, 3B) that outputs the processed sound signal. The output device 3 is, for example, a speaker. In this conference call system, a sound signal in which noise has been suppressed in the first telephone communication device (the first noise suppressing apparatus LA) arranged in a space where a first user 12A is situated is output from the output device 3B of the second telephone communication device arranged in a space where a second user 12B is situated. A sound signal in which noise has been suppressed in the second telephone communication device (the second noise suppressing apparatus 1B) arranged in the space where the second user 12B is situated is output from the output device 3A of the first telephone communication device arranged in the space where the first user 12A is situated.

In the second exemplary application, the microphone array 2 connected to the noise suppressing apparatus 1 may be arranged in any position. Thus, for example, when the first noise suppressing apparatus 1A and a microphone array 2A are arranged on a table that has a large dimension in the depth direction, such as a table 14A situated in the space where the first user 12A is situated, it is possible to arrange the microphone array 2A in front of the first user 12A. In this case, a first phase difference area and a second phase difference area are arranged such that the second phase difference area PA2 is included in the first phase difference area PA1, for example as illustrated in (b) of FIG. 2D.

Further, for example, when the second noise suppressing apparatus 1B and a microphone array 2B are arranged on a table that has a small dimension in the depth direction, such as a table 14B situated in the space where the second user 12B is situated, the microphone array 2B may be arranged on the right side of the second user 12B. In this case, the first phase difference area and the second phase difference area are arranged such that a portion of the second phase difference area PA2 overlaps the first phase difference area PA1, for example as illustrated in (b) of FIG. 2C.

The combination of the first phase difference area and the second phase difference area in the second exemplary application illustrated in FIG. 16B is not limited to the combination described above, and any other combination may, of course, be used.

In a conference call system, it is preferable that there be less deterioration in telephone communication quality due to, for example, an interruption of a beginning of a word, an interruption of an end of a word, or residual noise. Further, it is preferable that there be a little delay in processing when a vocalization communication is performed between users situated away from each other using a conference call system. Thus, the noise suppressing apparatus 1 according to the first and second embodiments is suitable for noise suppressing processing in a conference call system.

In the second exemplary application, the conference call system that transmits and receives a sound signal has been described, but the application is not limited to this, and the noise suppressing apparatus 1 is, of course, also applicable to a video conference call system that transmits and receives a video signal together with a sound signal.

Figure 16C:
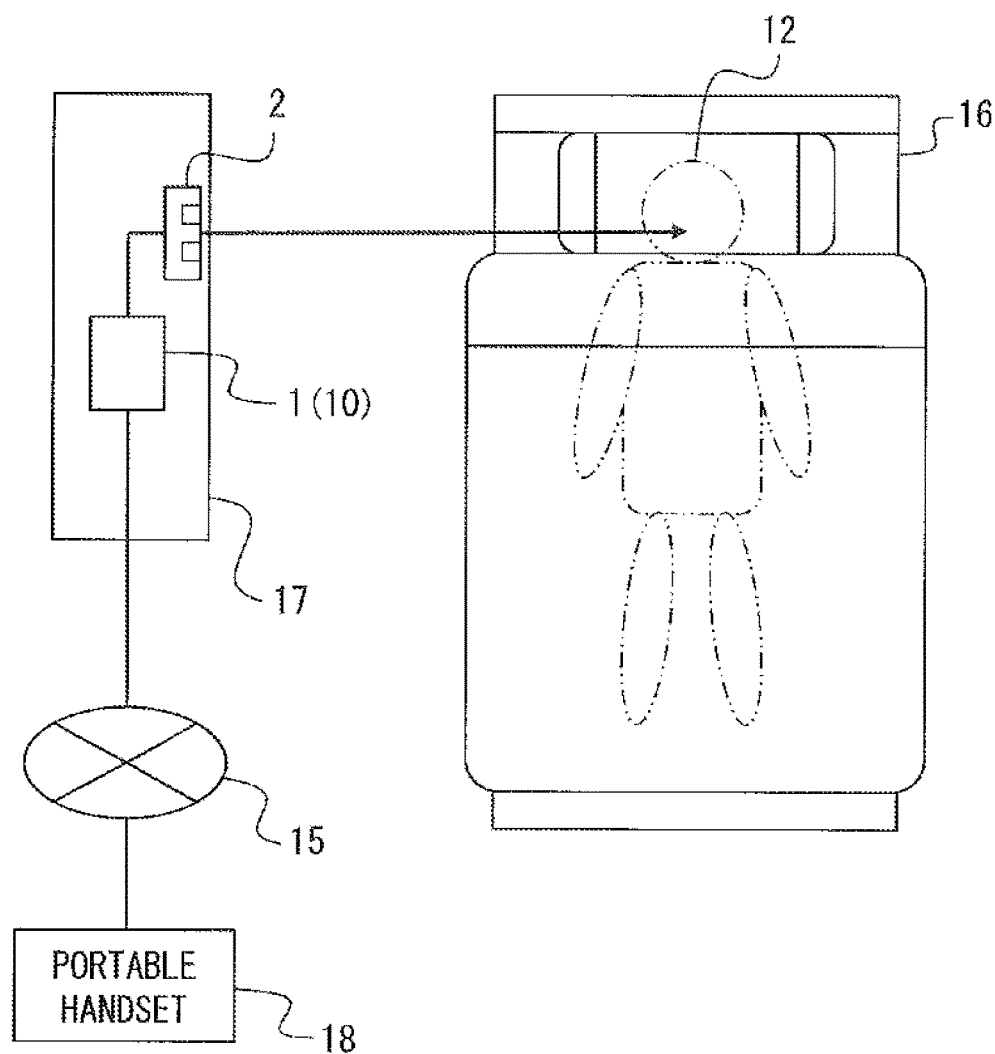
FIG. 16C is a diagram that illustrates a third exemplary application of the noise suppressing apparatus.

FIG. 16C is a diagram that illustrates a third exemplary application of the noise suppressing apparatus.

As the third exemplary application of the noise suppressing apparatus 1 described above, FIG. 16C illustrates an example of applying it to a system that observes a predetermined space from a remote location. For example, in this type of system, the noise suppressing apparatus 1 and the microphone array 2 are arranged on a piece of furniture 17 situated near a bed 16 arranged in a space (in a room) to be observed. For example, the microphone array 2 is arranged such that the head of the user 12 on the bed 16 is situated in a front direction of the microphone array 2. The noise suppressing apparatus 1 is connected to the communication network 15 such as the Internet. Thus, in the third exemplary application, for example, a portable handset 18 that an observer in a remote location has and the noise suppressing apparatus 1 can be connected to each other through the communication network 15. Further, for example, a sound processing device and the output device 3 such as a speaker (not illustrated) are connected to the noise suppressing apparatus 1, the sound processing device and the output device 3 performing predetermined processing on a sound signal received from the portable handset 18 and outputting the processed sound signal.

In this type of system, for example, the observer in a remote location can make a phone call with the user 12 in the room to be observed, using the portable handset 18. If there occurs, for example, an interruption of a beginning of a word, an interruption of an end of a word, or residual noise while the observer and the user 12 are making a phone call with each other, there is a possibility that the observer will not be able to correctly hear a vocalization of the user 12 correctly. This may result in, for example, not reporting an abnormality that has occurred in or around the user 12 to the observer correctly for some reason so that there will occur a delay in taking care of it. On the other hand, it is possible to suppress an interruption of a beginning of a word, an interruption of an end of a word, and residual noise when the noise suppressing apparatus 1 described above is used, which permits the user 12 and the observer to hear a vocalization of his/her counterpart correctly.

Further, in the system according to the third exemplary application, for example, it is also possible to transmit a vocalization of the user 12 to the portable handset 18 by, for example, an email including text data, using the speech recognition apparatus 10 instead of the noise suppressing apparatus 1.

The application of the noise suppressing apparatus 1 according to the first and second embodiments is not limited to a specific purpose of use including the above-described exemplary applications, but it is preferable that it be applied to a purpose of use, such as performing communication or making a phone call, for which a little delay in processing is desired. Likewise, the application of the speech recognition apparatus 10 according to the third embodiment is not limited to a specific purpose of use including the above-described exemplary applications, but it is preferable that it be applied to a purpose of use, such as speech recognition services using a mobile communications system, for which a little delay in processing is desired.

The noise suppressing apparatus 1 and the speech recognition apparatus 10 according to the above-described embodiments can be implemented using, for example, a computer and a program that is executed by the computer. The noise suppressing apparatus 1 and the speech recognition apparatus 10 that are implemented using a computer and a program are described with reference to FIG. 17.

FIG. 17 illustrates a hardware configuration of a computer.

As illustrated in FIG. 17, a computer 20 includes a processor 2001, a main storage 2002, an auxiliary storage 2003, an input device 2004, and a display device 2005. The computer 20 further includes an input/output interface 2006, a medium driving device 2007, and a communication controller 2008. These components 2001 to 2008 are connected to one another through a bus 2010, which makes it possible to perform transmission and reception of data between the components.

The processor 2001 is, for example, a central processing unit (CPU) or a micro processing unit (MPU). The processor 2001 executes various programs including an operating system, so as to control an entire operation of the computer 20. Further, the processor 2001 performs, for example, a variety of calculation processing including the calculation processing in the noise suppressing processing illustrated in FIG. 3.

The main storage 2002 includes a read only memory (ROM) and a random access memory (RAM) (not illustrated). For example, the ROM of the main storage 2002 has stored, for example, a predetermined basic control program that is read by the processor 2001 when the computer 20 starts. The RAM of the main storage 2002 is used by the processor 2001 as a working storage area as needed when the processor 2001 executes various programs. The RAM of the main storage 2002 can be used to temporarily store, for example, a phase difference area, a sound input signal, a frequency spectrum, a phase difference, and a suppression coefficient.

The auxiliary storage 2003 is a non-volatile memory, such as a flash memory, which has a higher capacity than the RAM of the main storage 2002. The auxiliary storage 2003 can store, for example, various programs executed by the processor 2001 and a variety of data. The auxiliary storage 2003 can be used to store, for example, a noise suppressing program or a speech recognition program that includes, for example, the processing of FIGS. 3, 9 (or 13), and 10. Further, the auxiliary storage 2003 can be used to store, for example, a phase difference area, a sound input signal, a frequency spectrum, a phase difference, a suppression coefficient, and vocalization information on a previous frame. When the computer 20 is provided with a hard disk drive (HDD) that can be used as the auxiliary storage 2003, the HDD can be used to store the above-described programs and a variety of data.

The input device 2004 is, for example, a button switch or a touch panel device. When an operator (for example, the user 12) of the computer 20 performs a predetermined manipulation on the input device 2004, the input device 2004 transmits input information associated with a content of the manipulation to the processor 2001. The input device 2004 can be used as the phase-difference-area setting unit 109 to perform, for example, a manipulation to set a first phase difference area PA1 and a second phase difference area PA2.

The display device 2005 is, for example, a liquid crystal display. The display device 2005 can be used to display, for example, an operational state of the computer 20 and a set value of a phase difference area.

The input/output interface 2006 connects the computer 20 to, for example, an electronic part or another electronic device (such as the microphone array 2).

The medium driving device 2007 reads a program or data that is recorded on a portable recording medium 21, and writes data or the like stored in the auxiliary storage 2003 to the portable recording medium 21. For example, a secure digital (SD) standard memory card (a flash memory) or a flash memory that is equipped with a universal serial bus (USB) standard connector can be used as the portable recording medium 21. The portable recording medium 21 can be used to store, for example, the above-described noise suppressing program, a sound input signal, and a sound signal after a noise suppression. Further, when the computer 20 is provided with an optical disk drive that can be used as the medium driving device 2007, various optical disks recognizable by the optical disk drive can be used as the portable recording medium 21. A compact disc (CD), a digital versatile disc (DVD), and Blu-ray Disc™ are examples of the optical disk that can be used as the portable recording medium 21.

The communication controller 2008 is a device that connects the computer 20 to a network and controls various communications performed between the computer 20 and another electronic device through the network. For example, the communication controller 2008 can be used to transmit and receive a sound signal in a telephone communication system or a conference call system by use of the computer 20.

When an instruction to start a program that includes noise suppressing processing is input to the computer 20 to which the microphone array 2 or the like is connected, the processor 2001 reads a program that includes the processing of FIG. 3 from a non-transitory recording medium such as the auxiliary storage 2003, so as to execute the program. In this case, the processor 2001 serves (operates) as, for example, the signal transformer 102, the phase difference calculator 103, the sound-arrival-rate calculator 104, the dissimilarity calculator 105, the vocalization determination unit 106, the suppression coefficient determination unit 107, and the output signal generator 108 of the noise suppressing apparatus 1 or the speech recognition apparatus 10. When the speech recognition program is executed in the computer 20, the processor 2001 serves (operates) as the speech recognition processing unit 110 in addition to the above-described components 102 to 108. When the computer 20 executes the program that includes the processing of FIG. 3, the RAM of the main storage 2002, the auxiliary storage 2003, and the portable recording medium 21 serve as the phase-difference-area storage 120, the vocalization information storage 121, and the storage 122 for a word dictionary.

The computer 20 that is operated as the noise suppressing apparatus 1 or the speech recognition apparatus 10 does not necessarily include all of the components 2001 to 2008 of FIG. 17, and some of the components can be omitted according to the applications or the requirements. For example, the computer 20 may have a configuration in which the medium driving device 2007 and the communication controller 2008 have been omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A noise suppressing apparatus that suppresses noise included in a sound signal, the noise suppressing apparatus comprising:
    a memory; and
    a processor configured to be connected to the memory and to perform processing of suppressing the noise included in the sound signal, wherein
    the processing of suppressing the noise includes:
        calculating a phase difference on the basis of frequency spectra of a first sound signal and a second sound signal obtained by picking up a pickup target sound using a microphone array;
        calculating a first sound arrival rate on the basis of a first phase difference area and the phase difference and calculating a second sound arrival rate on the basis of a second phase difference area and the phase difference, wherein the first phase difference area is set on the basis of a direction of arrival of the pickup target sound which arrives at the microphone array, and the second phase difference area is different from the first phase difference area;
        calculating a dissimilarity that represents a level of difference between the first sound arrival rate and the second sound arrival rate;
        determining whether the pickup target sound is included in the first sound signal on the basis of the dissimilarity; and
        determining a suppression coefficient to be applied to the frequency spectrum with respect to the first sound signal, on the basis of a result of the determination of whether the pickup target sound is included and on the basis of the phase difference.

2. The noise suppressing apparatus according to claim 1, wherein
    the processor further sets the second phase difference area on the basis of a relationship between a direction of arrival of the noise, the direction of arrival of the pickup target sound, and the first phase difference area.

3. The noise suppressing apparatus according to claim 2, wherein
    the processor sets the second phase difference area which is adjacent to the first phase difference area.

4. The noise suppressing apparatus according to claim 2, wherein
    the processor sets the second phase difference area which is situated away from the first phase difference area.

5. The noise suppressing apparatus according to claim 2, wherein
    the processor sets the second phase difference area which has a portion overlapping the first phase difference area.

6. The noise suppressing apparatus according to claim 2, wherein
    the processor sets the second phase difference area which is included in the first phase difference area.

7. The noise suppressing apparatus according to claim 1, wherein
the processor calculates, as the dissimilarity, a value obtained by dividing the first sound arrival rate by the second sound arrival rate.

8. The noise suppressing apparatus according to claim 1, wherein
the processor calculates, as the dissimilarity, a value obtained by subtracting the second sound arrival rate from the first sound arrival rate.

9. The noise suppressing apparatus according to claim 1, wherein
the processor calculates the suppression coefficient on the basis of the phase difference when the pickup target sound is included in the first sound signal, and determines, to be a suppression coefficient that is to be applied to the frequency spectrum, a minimum value of the suppression coefficient calculated on the basis of the phase difference when the pickup target sound is not included in the first sound signal.

10. The noise suppressing apparatus according to claim 1, wherein
the processor further stores, in the memory, the result of the determination of whether the pickup target sound is included, wherein
when the processor determines whether the pickup target sound is included in the first sound signal which is a current processing target, the processor
reads the determination result stored in the memory,
determines, on the basis of the dissimilarity, whether the pickup target sound is included in the first sound signal which is the current processing target when the pickup target sound is not included in the first sound signal which is prior to the first sound signal which is the current processing target, and
determines, on the basis of the first sound arrival rate, whether the pickup target sound is included in the first sound signal which is the current processing target when the pickup target sound is included in the first sound signal which is prior to the first sound signal which is the current processing target.

11. A speech recognition apparatus that suppresses noise included in a sound signal and performs speech recognition processing on a sound signal in which the noise has been suppressed, the speech recognition apparatus comprising:
a memory; and
a processor configured to be connected to the memory and to perform processing of suppressing the noise included in the sound signal, wherein
the processing of suppressing the noise includes:
calculating a phase difference on the basis of frequency spectra of a first sound signal and a second sound signal obtained by picking up a pickup target sound using a microphone array;
calculating a first sound arrival rate on the basis of a first phase difference area and the phase difference and calculating a second sound arrival rate on the basis of a second phase difference area and the phase difference, wherein the first phase difference area is set on the basis of a direction of arrival of the pickup target sound which arrives at the microphone array, and the second phase difference area is different from the first phase difference area;
calculating a dissimilarity that represents a level of difference between the first sound arrival rate and the second sound arrival rate;
determining whether the pickup target sound is included in the first sound signal on the basis of the dissimilarity;
determining a suppression coefficient to be applied to the frequency spectrum with respect to the first sound signal, on the basis of a result of the determination of whether the pickup target sound is included and on the basis of the phase difference;
applying the determined suppression coefficient to the frequency spectrum; and
transforming the frequency spectrum to which the suppression coefficient has been applied into a sound signal.

12. A noise suppressing method for suppressing noise included in a sound signal, the noise suppressing method comprising:
calculating, by a computer, a phase difference on the basis of frequency spectra of a first sound signal and a second sound signal obtained by picking up a pickup target sound using a microphone array;
calculating, by the computer, a first sound arrival rate on the basis of a first phase difference area and the phase difference and calculating, by the computer, a second sound arrival rate on the basis of a second phase difference area and the phase difference, wherein the first phase difference area is set on the basis of a direction of arrival of the pickup target sound which arrives at the microphone array, and the second phase difference area is different from the first phase difference area;
calculating, by the computer, a dissimilarity that represents a level of difference between the first sound arrival rate and the second sound arrival rate;
determining, by the computer, whether the pickup target sound is included in the first sound signal on the basis of the dissimilarity; and
determining, by the computer, a suppression coefficient to be applied to the frequency spectrum with respect to the first sound signal, on the basis of a result of the determination of whether the pickup target sound is included and on the basis of the phase difference.

* * * * *